(12) United States Patent
Howard et al.

(10) Patent No.: US 11,432,542 B2
(45) Date of Patent: Sep. 6, 2022

(54) PEST CONTROL SYSTEM AND METHOD OF OPERATING SAME

(71) Applicant: DOW AGROSCIENCES LLC, Indianapolis, IN (US)

(72) Inventors: Phillip J. Howard, Greenville, SC (US); Richard V. Baxter, Jr., Appleton, WI (US); Douglas K. Brune, Carmel, IN (US); Uriel Kluk, Lincoln, IL (US); Edward G. Beistle, Appleton, WI (US); Christopher Siler, Hemlock, MI (US); Marc Black, Midland, MI (US)

(73) Assignee: DOW AGROSCIENCES LLC, Indianapolis, IN (US)

( * ) Notice: Subject to any disclaimer, the term of this patent is extended or adjusted under 35 U.S.C. 154(b) by 0 days.

(21) Appl. No.: 17/410,004

(22) Filed: Aug. 24, 2021

(65) Prior Publication Data

US 2021/0378231 A1     Dec. 9, 2021

Related U.S. Application Data

(63) Continuation of application No. 16/829,072, filed on Mar. 25, 2020, now Pat. No. 11,116,203, which is a
(Continued)

(51) Int. Cl.
*A01M 31/00* (2006.01)
*A01M 23/30* (2006.01)
(Continued)

(52) U.S. Cl.
CPC .......... *A01M 31/002* (2013.01); *A01M 1/026* (2013.01); *A01M 23/30* (2013.01); *A01M 1/02* (2013.01); *A01M 1/10* (2013.01)

(58) Field of Classification Search
CPC .................................................. A01M 31/002
See application file for complete search history.

(56) References Cited

U.S. PATENT DOCUMENTS

| 8,816,986 B1 * | 8/2014 | Park | G06F 3/0446 |
| | | | 345/173 |
| 11,033,018 B2 * | 6/2021 | Laut | B01F 27/0542 |
| (Continued) | | | |

*Primary Examiner* — Travis R Runnings
(74) *Attorney, Agent, or Firm* — Barnes & Thornburg LLP

(57) ABSTRACT

A pest control device comprising a capacitive sensor array including a plurality of sensor pads, the capacitive sensor array being configured to generate an electrical output signal indicating the state of each sensor pad, and an electronic controller electrically connected to the capacitive sensor array, the electronic controller including a processor and a memory including a plurality of instructions, which, when executed by the processor, causes the processor to: receive the electrical output signals from the capacitive sensor array, determine a measured capacitance value for each sensor pad based on each electrical output signal, calculate a baseline for each sensor pad based on the measured capacitance value of the sensor pad, determine whether a difference between the measured capacitance value of at least one sensor pad and its corresponding baseline exceeds a first predetermined threshold, update a counter when the first predetermined threshold is exceeded, and record an event indicative of a presence of a pest when the counter exceeds a predetermined limit.

20 Claims, 25 Drawing Sheets

Related U.S. Application Data continuation of application No. 16/653,318, filed on Oct. 15, 2019, now Pat. No. 10,638,746, which is a continuation of application No. 16/553,295, filed on Aug. 28, 2019, now Pat. No. 10,548,308, which is a continuation of application No. 15/524,444, filed as application No. PCT/US2015/058756 on Nov. 3, 2015, now abandoned.

(60) Provisional application No. 62/243,410, filed on Oct. 19, 2015, provisional application No. 62/236,519, filed on Oct. 2, 2015, provisional application No. 62/074,913, filed on Nov. 4, 2014.

(51) Int. Cl.
*A01M 1/02* (2006.01)
*A01M 1/10* (2006.01)

(56) References Cited

U.S. PATENT DOCUMENTS

| | | | |
|---|---|---|---|
| 2006/0215885 A1* | 9/2006 | Kates | A01M 31/002 382/120 |
| 2009/0192763 A1* | 7/2009 | Gardner, Jr | A01M 1/026 702/187 |
| 2009/0205245 A1* | 8/2009 | Orchard | A01M 23/08 43/65 |
| 2010/0134301 A1* | 6/2010 | Borth | A01M 1/2011 340/573.2 |
| 2018/0235205 A1* | 8/2018 | Howard | A01M 23/30 |
| 2021/0185998 A1* | 6/2021 | Siler | A01M 23/38 |

\* cited by examiner

PEST CONTROL SYSTEM AND METHOD OF OPERATING SAME

CROSS-REFERENCE TO RELATED APPLICATIONS

This application is a continuation application of U.S. application Ser. No. 16/829,072, entitled "PEST CONTROL SYSTEM AND METHOD OF OPERATING SAME," which was filed on Mar. 25, 2020, and which is a continuation of U.S. application Ser. No. 16/653,318, entitled "PEST CONTROL SYSTEM AND METHOD OF OPERATING SAME," which was filed on Oct. 15, 2019, and which issued on May 5, 2020 as U.S. Pat. No. 10,638,746, and which is a continuation of U.S. application Ser. No. 16/553,295, entitled "PEST CONTROL SYSTEM AND METHOD OF OPERATING SAME," which was filed on Aug. 28, 2019 and which issued on Feb. 4, 2020 as U.S. Pat. No. 10,548,308, and which is a continuation application of U.S. application Ser. No. 15/524,444, entitled "PEST CONTROL SYSTEM AND METHOD OF OPERATING SAME," which was filed on May 4, 2017, and which is a national stage entry under 35 USC § 371(b) of PCT International Application No. PCT/US2015/058756, filed Nov. 3, 2015, and claims the benefit of and priority to U.S. Patent Application No. 62/074,913 filed Nov. 4, 2014 and entitled "CAPACITIVE SENSING HARDWARE AND SOFTWARE IN THE DETECTION OF PESTS," U.S. Patent Application No. 62/236,519 filed Oct. 2, 2015 and entitled "PEST CONTROL DEVICE AND METHOD OF MONITORING POSITION OF SAME," and U.S. Patent Application No. 62/243,410 filed on Oct. 19, 2015 and entitled "PEST CONTROL SYSTEM AND METHOD OF OPERATING SAME." Each of those applications is expressly incorporated herein by reference.

TECHNICAL FIELD

The present disclosure relates generally to devices for controlling pests, and, more specifically, to devices for monitoring and communicating the presence of pests, and eliminating pests.

BACKGROUND

The detection and removal of pests from areas occupied by humans, livestock, crops, and other pest-attracting areas has long been a challenge. Pests of frequent concern include various types of insects and rodents. Subterranean termites are a particularly troublesome type of pest with the potential to cause severe damage to wooden structures. Likewise, other insects, such as bedbugs, are problematic. Additionally, rodent control is often challenging. Various schemes have been proposed to eliminate these and certain other harmful pests. Some of those schemes use one or more stations, which must be periodically checked by service personnel. Similarly, rodent traps in residential and commercial settings need to be routinely checked by service personnel.

SUMMARY

According to one aspect of the disclosure, a pest control device is disclosed. The pest control device comprises a capacitive sensor array including a plurality of sensor pads, and an electronic controller electrically connected to the capacitive sensor array. The capacitive sensor array is configured to generate an electrical output signal indicating the state of each sensor pad. The electronic controller includes a processor and a memory including a plurality of instructions, which, when executed by the processor, causes the processor to receive the electrical output signals from the capacitive sensor array, determine a measured capacitance value for each sensor pad based on each electrical output signal, calculate a baseline for each sensor pad based on the measured capacitance value of the sensor pad, determine whether a difference between the measured capacitance value of at least one sensor pad and its corresponding baseline exceeds a first predetermined threshold, update a counter when the first predetermined threshold is exceeded, and record an event indicative of a presence of a pest when the counter exceeds a predetermined limit.

In some embodiments, the plurality of instructions further cause the processor to calculate each baseline using the following equations:

$$A(\text{new}) = A(\text{old}) - A(\text{old}) * \left(\frac{Kf}{2^{16}}\right) + Cmeas$$

$$\text{Baseline} = A(\text{new}) * \left(\frac{Kf}{2^{16}}\right)$$

"Kf" may be a parameter stored in a memory device of the electronic controller, "Cmeas" may be the measured capacitance value corresponding to the electrical output signal of one sensor pad, and "A(old)" may be a variable stored in memory. In some embodiments, the electronic controller may be configured to receive values of Kf from a remote system.

In some embodiments, the electronic controller is configured to record a second event when the electrical output signals indicate a presence of a human.

In some embodiments, the plurality of instructions further cause the processor to determine a sequence of sensor pad contacts based on the electrical output signals, compare the sequence of sensor pad contacts to a predetermined sequence, and record the second event when the sequence of sensor pad contacts matches the predetermined sequence. The pest control device may include a first visual indicator electrically connected to the electronic controller, and the electronic controller may be configured to energize the first visual indicator when the sequence of sensor pad contacts matches the predetermined sequence.

In some embodiments, the pest control device may include a second visual indicator electrically connected to the electronic controller, and the electronic controller may be configured to energize the first visual indicator and the second visual indicator when the electrical output signals indicate the presence of the pest.

In some embodiments, the plurality of instructions further cause the processor to determine whether the difference between the measured capacitance value of at least one sensor pad exceeds a second predetermined threshold, and update the counter when the difference is less than the second predetermined threshold. In some embodiments, the plurality of instructions further cause the processor to determine a sequence of sensor pad contacts based on the electrical output signals when the difference is greater than the second predetermined threshold, compare the sequence of sensor pad contacts to a predetermined sequence, and record the second event when the sequence of sensor pad contacts matches the predetermined sequence.

In some embodiments, the pest control device may include a position sensor operable to generate an electrical output signal indicative of movement of the pest control device. In some embodiments, the plurality of instructions cause the processor to receive the electrical output signal from the position sensor, determine, based on the electrical output signals, whether the pest control device has been in a first position for a predetermined period of time, determine, based on the electrical output signals, a deflection angle of the pest control device when the pest control device has been in the first position for the predetermined period of time, compare the deflection angle of the pest control device to a predetermined angular threshold, and generate an output signal when the deflection angle is greater than the predetermined angular threshold.

According to another aspect, a method of monitoring for pests is disclosed. The method includes generating an electrical output signal from a capacitive sensor array, receiving the electrical output signal from the capacitive sensor array, determining a measured capacitance value based on the electrical output signal, calculating a baseline for each sensor pad based on the measured capacitance value for the sensor pad, determining whether a difference between the measured capacitance value of at least one sensor pad and its corresponding baseline exceeds a first predetermined threshold, updating a counter when the first predetermined threshold is exceeded, and recording an event indicative of a presence of a pest when the counter exceeds a predetermined limit.

In some embodiments, the plurality of instructions further cause the processor to calculate each baseline using the following equations:

$$A(\text{new}) = A(\text{old}) - A(\text{old}) * \left(\frac{Kf}{2^{16}}\right) + Cmeas$$

$$\text{Baseline} = A(\text{new}) * \left(\frac{Kf}{2^{16}}\right)$$

"Kf" may be a parameter stored in a memory device of the electronic controller, "Cmeas" may be the measured capacitance value corresponding to the electrical output signal of one sensor pad, and "A(old)" may be a variable stored in memory.

In some embodiments, the method may include recording a second event when the electrical output signals indicate a presence of a human.

In some embodiments, the method may include determining whether the difference between the measured capacitance value of at least one sensor pad and its corresponding baseline exceeds a second predetermined threshold, and updating the counter when the difference is less than the second predetermined threshold. The method may include determining a sequence of sensor pad contacts based on the electrical output signals when the difference is greater than the second predetermined threshold, and comparing the sequence of sensor pad contacts to a predetermined sequence. In some embodiments, recording the second event may include determining the sequence of sensor pad contacts matches the predetermined sequence.

According to another aspect, a pest control system is disclosed. The system includes a station including a chamber sized to receive a pest, and a control device coupled to the station. The control device includes a capacitive sensor array including a plurality of sensor pads, the capacitive sensor array being configured to generate an electrical output signal indicating the state of each sensor pad, and an electronic controller electrically connected to the capacitive sensor array. The electronic controller being configured to receive the electrical output signals from the capacitive sensor array, and record a first event when at least one of the electrical output signals indicates a presence of a pest. In some embodiments, the electronic controller is configured to record a second event when at least one of the electrical output signals indicates a presence of a human.

In some embodiments, the system includes bait positioned in the chamber of the station. Additionally, in some embodiments, the control device may further include a position sensor operable to generate an electrical output signal indicative of movement of the station. The electronic controller may be configured to record a movement event based on the electrical output signal from the position sensor.

In some embodiments, the control device may further include a temperature sensor.

According to another aspect, a pest control system is disclosed. The system includes a pest control device. The pest control device includes a sensor array operable to generate electrical output signals indicative of a presence of a pest, an orientation sensor operable to generate a plurality of electrical output signals indicative of the position of the pest control device, and an electronic controller electrically connected to the sensor array and the position sensor. The electronic controller further includes a processor and a memory including a plurality of instructions, which, when executed by the processor, causes the processor to: receive the electrical output signal from the position sensor, determine, based on the electrical output signals, whether the pest control device has been in a first position for a predetermined period of time, determine, based on the electrical output signals, a deflection angle of the pest control device when the pest control device has been in the first position for the predetermined period of time, compare the deflection angle of the pest control device to a predetermined angular threshold, and generate an output signal when the deflection angle is greater than the predetermined angular threshold.

In some embodiments, the position sensor may be an accelerometer. In some embodiments, the pest control system further comprises a pest trap device, and the pest control device is configured to be coupled to the pest trap device.

In some embodiments, the pest control device further comprises an outer casing and a support leg pivotally coupled to the outer casing, the support leg including a panel sized to be positioned below the pest trap device. In some embodiments, the support leg may be coupled to the outer casing via a mounting arm of a plurality of mounting arms, the plurality of mounting arms extending along a sidewall of the outer casing.

In some embodiments, the pest trap device includes a hinged bar operable to pivot about an axis. In some embodiments, the pest control device may comprise an outer casing and at least one clip operable to engage the hinged bar such that the pest control device is moved with the hinged bar when the hinged bar is pivoted about the axis.

In some embodiments, the pest trap device further comprises a base and a pivoting member pivotally coupled to the base, and the pest control device is mounted on a top surface of the pivoting member.

According to another aspect, a pest control system is disclosed. The system includes a pest control device and a pest control device. The pest control device is configured to be coupled to the pest trap device. The pest control device includes an electronic controller electrically connected to the capacitive sensor array. The electronic controller is further configured to receive the electrical output signals from the capacitive sensor array, determine a measured capacitance value for each sensor pad based on each electrical output signal, calculate baselines for the sensor pads based on the measured capacitance values, determine whether a difference between the measured capacitance value of at least one sensor pad and its corresponding baseline exceeds a first predetermined threshold, update a counter when the first predetermined threshold is exceeded, and record an event indicative of a presence of a pest when the counter exceeds a predetermined limit.

In some embodiments, the pest control device comprises a capacitive sensor array including a plurality of sensor pads. The capacitive sensor array may be configured to generate an electrical output signal indicating the state of each sensor pad. In some embodiments, the electronic controller may be configured to receive the electrical output signals from the capacitive sensor array, and record a first event when at least one of the electrical output signals indicates a presence of a pest.

In some embodiments, the pest control device further comprises an outer casing and a support leg pivotally coupled to the outer casing, the support leg including a panel sized to be positioned below the pest trap device. In some embodiments, the pest trap device may include a hinged bar operable to pivot about an axis. In some embodiments, the pest control device may comprise an outer casing and at least one clip operable to engage the hinged bar such that the pest control device is moved with the hinged bar when the hinged bar is pivoted about the axis.

In some embodiments, the support leg is coupled to the outer casing via a mounting arm of a plurality of mounting arms, the plurality of mounting arms extending along a sidewall of the outer casing.

According to another aspect, a method of monitoring for pests is disclosed. The method includes recording a plurality of orientation values from an orientation sensor of a pest control device that is removably coupled to a pest trap device, each orientation value is comprising (x, y, z) coordinates corresponding to an orientation of the pest control device, determining whether the pest control device is stable based on the plurality of orientation values, determining an orientation of the pest control device when the pest control device is stable, determining a trap condition of the pest trap device based on the orientation of the pest control device, and transmitting the trap condition to a remote system to determine a trap status of the pest trap device.

In some embodiments, recording the plurality of orientation values further comprises recording each orientation value from the orientation sensor after a predetermined time interval has lapsed until a predetermined number of the orientation values are recorded.

In some embodiments, the predetermined number of the orientation values is at least 8 orientation values.

In some embodiments, determining whether the pest control device is stable based on the plurality of orientation values comprises determining maximum orientation values and minimum orientation values from the plurality of orientation values for each of the (x, y, z) coordinates, determining differences between the maximum orientation values and the minimum orientation values for each of the (x, y, z) coordinates of the plurality of orientation values, determining whether all of the differences are less than or equal to a first set of predetermined thresholds, determining average orientation value for each of the (x, y, z) coordinates of the plurality of orientation values when all of the differences are less than or equal to the first set of predetermined thresholds, and storing the (x, y, z) coordinates of the average orientation value with a new stable orientation value to indicate that the pest control device is stable.

In some embodiments, determining whether the pest control device is stable based on the plurality of orientation values comprises determining maximum orientation values and minimum orientation values from the plurality of orientation values for each of the (x, y, z) coordinates, determining differences between the maximum orientation values and the minimum orientation values for each of the (x, y, z) coordinates, determining whether a sum of the differences is less than or equal to a first predetermined threshold, determining average orientation values for each of the (x, y, z) coordinates from the plurality of orientation values when the sum of the differences is less than or equal to the first predetermined threshold, and updating the average orientation values to a new stable orientation coordinates.

In some embodiments, determining an orientation of the pest control device when the pest control device is stable comprises identifying a (x, y, z) coordinates of a previous stable orientation value, determining a deflection angle of the pest control device using the (x, y, z) coordinates of the new stable orientation value, determining the deflection angle exceeds a second predetermined threshold, updating the trap condition when the second predetermined threshold is exceeded, and updating the previous stable orientation value with the new stable orientation value.

In some embodiments, calculating the deflection angle of the pest control device includes using the following equations:

$$DeflectionAngle = \cos^{-1}\left(\frac{(A_X * B_X) + (A_Y * B_Y) + (A_Z * B_Z)}{\sqrt{(A_X^2 + A_Y^2 + A_Z^2) * (B_X^2 + B_Y^2 + B_Z^2)}}\right)$$

"$A_x$", "$A_y$", "$A_z$" are the (x, y, z) coordinates of new stable orientation value, and "$B_x$", "$B_y$", "$B_z$" are the (x, y, z) coordinates of previous stable orientation value.

BRIEF DESCRIPTION OF THE DRAWINGS

The detailed description particularly refers to the following figures, in which.

DETAILED DESCRIPTION OF THE DRAWINGS

Figure 1:
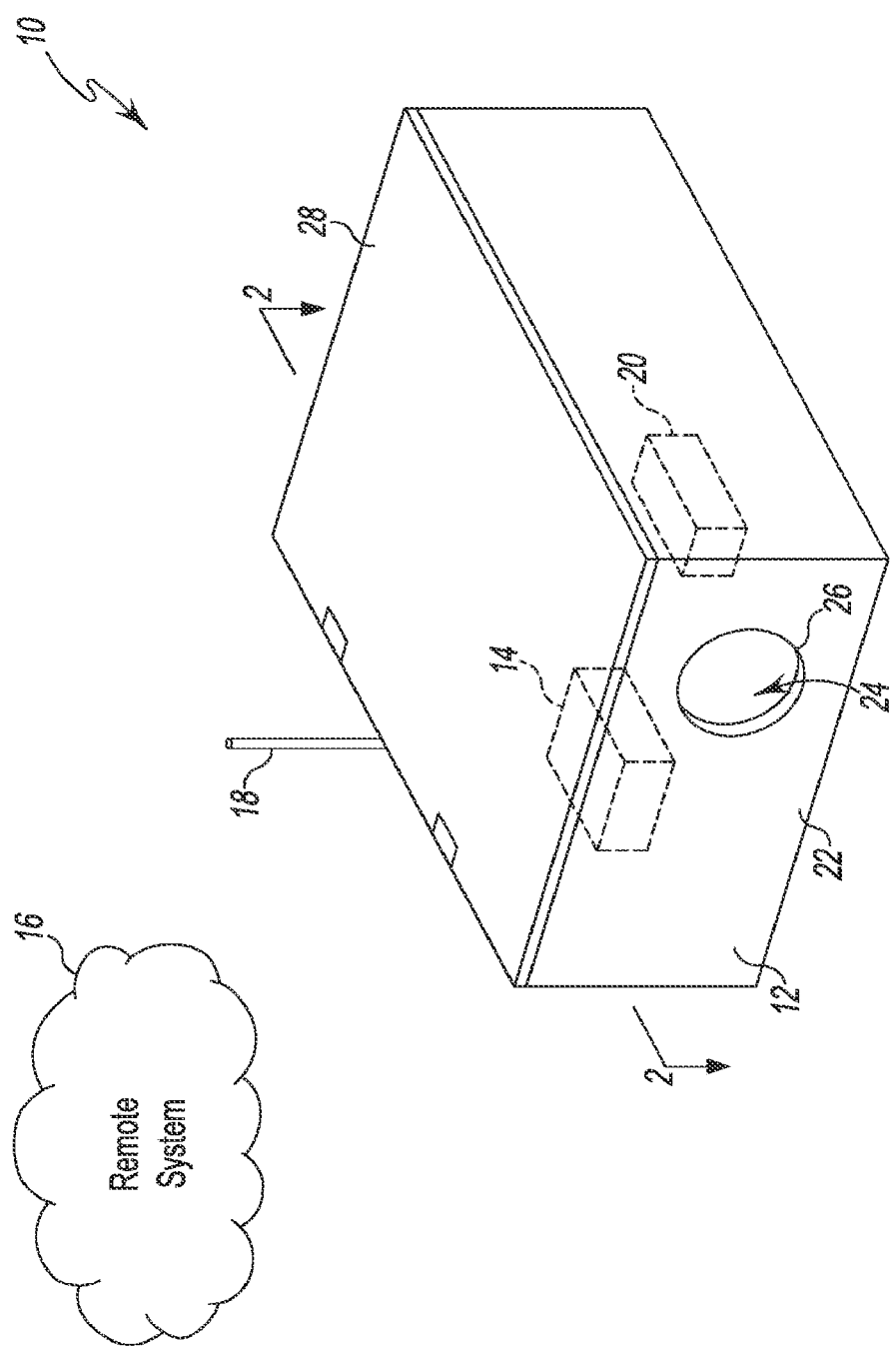
FIG. 1 is a perspective view of a pest control system.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 12:
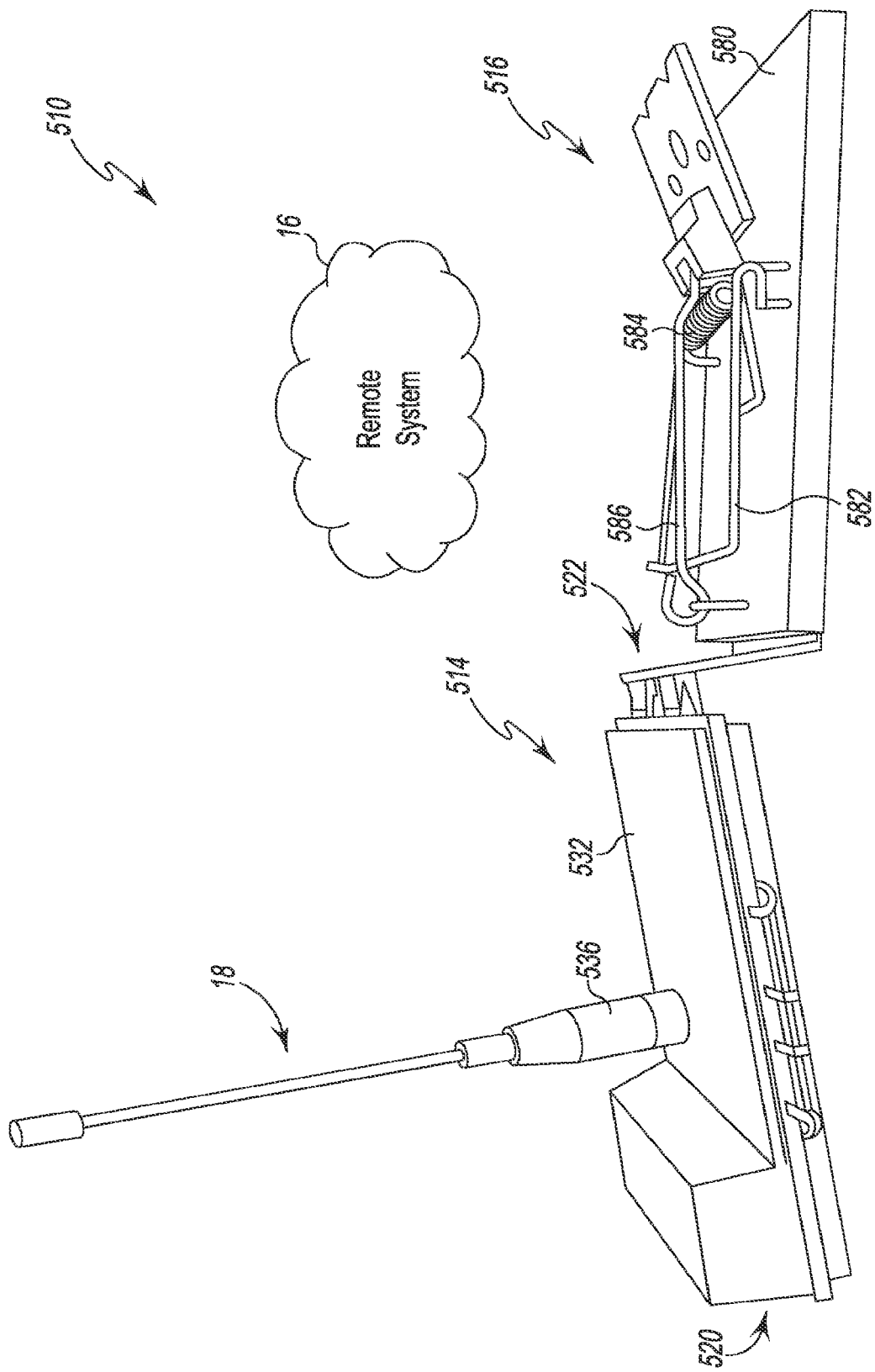
FIG. 12 is a perspective view of another embodiment of a pest control system including another embodiment of a pest control device and a pest trap device.

Referring now to FIG. 1, a pest control system including a pest control station 10 is shown. In the illustrative embodiment, the pest control station 10 is a rodent control station 10 configured to monitor a particular location. The station 10 includes a housing 12 and a pest control device 14 positioned in the housing 12. As described in greater detail below, the pest control device 14 is configured to detect the presence of rodents in the station 10 and report that presence to a remote system 16 wirelessly via an antenna 18. In other embodiments, the pest control device 14 may also include a pest trap device that detains and/or exterminates the rodent. One exemplary pest trap device is shown in FIG. 12.

The station 10 also includes bait 20 in the form of a pest-consumable material. In some embodiments, the pest-consumable material may include a rodenticide. In other embodiments, the bait 20 may be a lure or other pest-attracting material. In still other embodiments, the station 10 may not include bait.

The control station may also be configured to monitor for the presence of other pests such as, for example, termites, bed bugs, other insects, or other pests of concern. In those embodiments, the control station may include a pest-specific sensor. The control station may also include bait in the form of a material that is consumable to the particular pest. Additionally, the bait may include an insecticide or other pest-specific pesticide.

The housing 12 is illustratively formed from a hard, durable plastic, but, in other embodiments, it may be formed from any environmentally resistant material. The housing 12 of the station 10 includes a plurality of outer walls 22 that define an inner chamber 24. The pest control device 14 and the bait 20 are positioned in the chamber 24. In the illustrative embodiment, a pest may enter the station 10 through a circular opening 26 defined in each opposite wall 22.

The station 10 also includes a cover 28 that is hinged to the housing 12. The cover 28 is illustratively formed from the same material as the housing. The cover 28 is movable between the closed position shown in FIG. 1 and an open position (not shown) in which the chamber 24, and hence the control device 14 and bait 20, are accessible for maintenance or other servicing. It should be appreciated that in other embodiments the cover may be removable from the housing. In still other embodiments, the cover may be omitted from the station 10.

Figure 2:
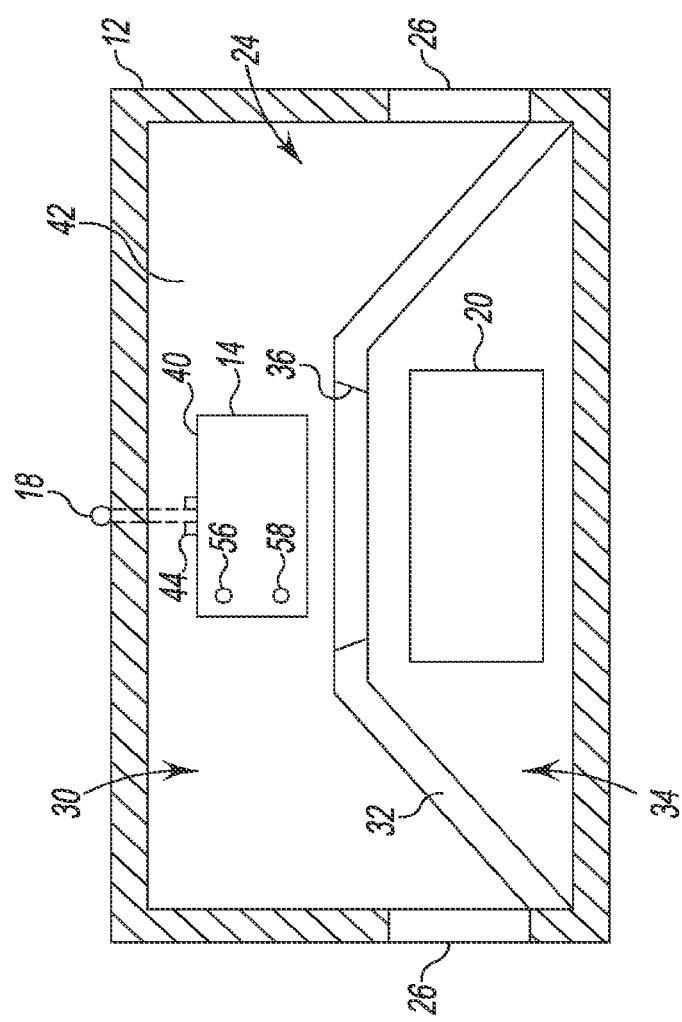
FIG. 2 is a cross-sectional plan view of a pest control station of FIG. 1 taken along the line 2-2 in FIG. 1.

As shown in FIG. 2, a passageway 30 of the inner chamber 24 of the housing 12 connects the openings 26. The chamber 24 is divided by an interior wall 32 into the passageway 30 and a bait chamber 34 that holds the bait 20. The interior wall 32 includes an opening 36 through which a pest may enter the bait chamber 34 from the passageway 30, thereby gaining access to the bait 20 positioned in the bait chamber 34. In the illustrative embodiment, the interior wall 32 is irregularly-shaped such that the inner chamber 24 is not divided equally between the passageway 30 and the bait chamber 34. It should be appreciated that in other embodiments the chamber 24 may include different arrangements of passageways and chambers. In still other embodiments, the chamber 24 may consist of only a single chamber.

As shown in FIG. 2, the pest control device 14 is embedded in a slot 40 formed in the floor 42 of the housing 12. The slot 40 (and hence the control device 14) is positioned in the passageway 30 in front of the opening 36. In that way, a pest entering and exiting the bait chamber 34 passes over, or in proximity to, the pest control device 14 such that the control device 14 may detect the pest, as described in greater detail below. In some embodiments, bait may be placed in a cup or dish on the sensor of the control device 14 to lure the rodents onto the sensor. In the illustrative embodiment, the pest control device 14 is removable from the slot 40 for replacement or other maintenance. In other embodiments, the control device 14 may be integrally formed with the housing 12 or otherwise not removable from the housing 12.

As described above, the pest control device 14 is configured to detect the presence of rodents in the station 10 and report that presence to a remote system 16 wirelessly via an antenna 18. As shown in FIGS. 1-2, the antenna 18 is a whip antenna consisting of a single straight flexible metal wire. The antenna 18 is connected at its base to the pest control device 14 via a connector 44. In that way, the pest control device 14 may be disconnected from the antenna 18. In other embodiments, the pest control device 14 and the antenna 18 may be formed as a single unit. It should also be appreciated that in other embodiments the antenna 18 may be a low-profile helical antenna, hardware circuit in the pest control device 14, or other type of antenna capable of transmitting and receiving signals between the pest control device 14 and the system 16.

Figure 3:
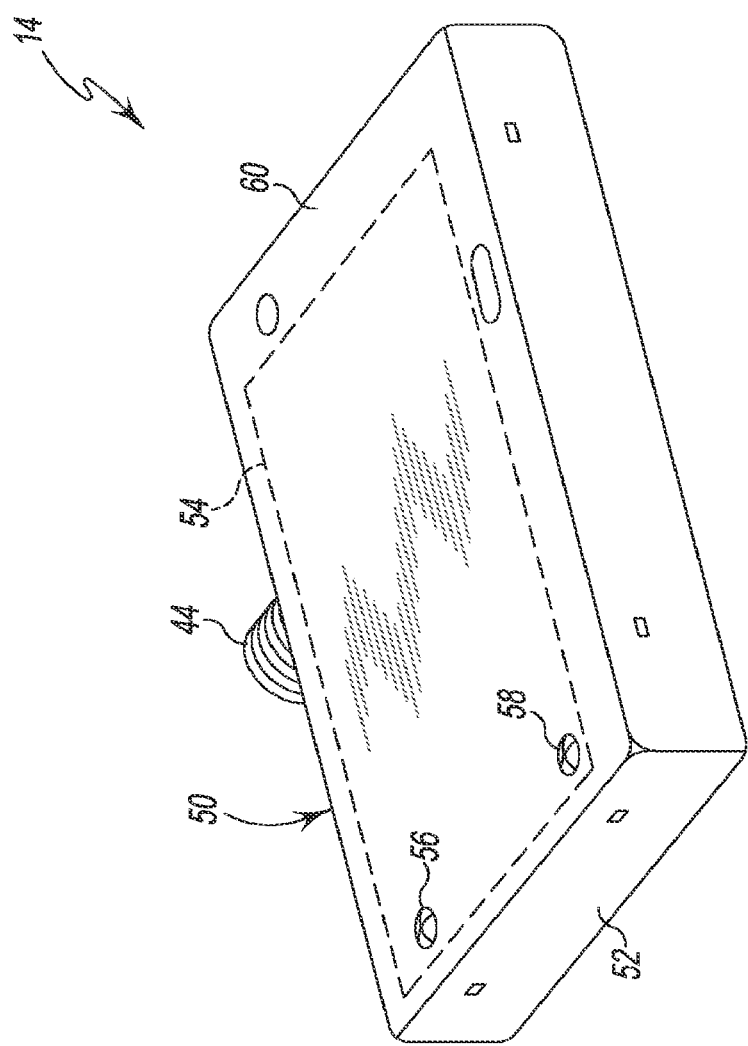
FIG. 3 is a perspective view of a pest control device of the control station of FIG. 2.

As shown in FIG. 3, the antenna connector 44 extends outwardly from the rear wall 50 of an outer casing 52 of the pest control device 14. The outer casing 52 houses the electrical components 54, which include a pair of light emitting diodes (LEDs) 56, 58. In the illustrative embodiment, the LEDs 56, 58 are positioned in openings defined in the top surface 60 of the casing 52 and are configured to emit different colors (red and green, respectively) to indicate status of the pest control device 14. In other embodiments, LEDs emitting other colors or the same color may be used. In still other embodiments, other indicators may be used to indicate visually or audibly the status of the pest control device 14.

The casing 52 is illustratively formed from a plastic material that protects the electrical components 54 from environmental factors, including water ingress, dust, dirt, leaves, humidity, and waste. It should be appreciated that in other embodiments other materials may be used in the casing 52. The casing 52 measures approximately 50 mm by 75 mm by 15 mm. It should be appreciated that in other embodiments the casing 52 (and hence the control device 14) may be larger or smaller depending on, for example, the nature of the pest and the monitoring environment.

Figure 4:
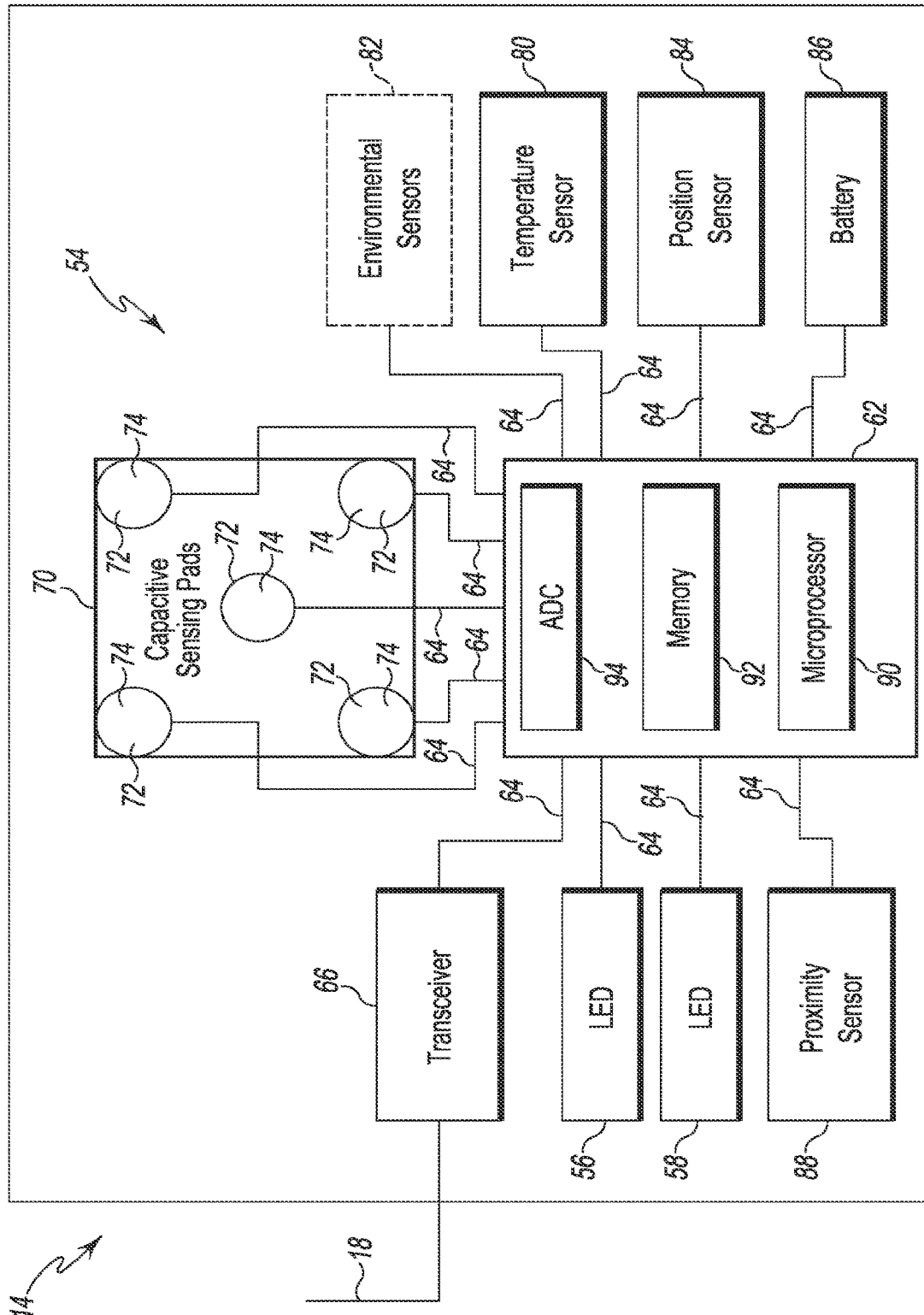
FIG. 4 is a block diagram schematic of the pest control device of FIG. 3.

Referring now to FIG. 4, the electrical components 54 of the pest control device 14 are shown in a simplified block diagram. In the illustrative embodiment, the electrical components 54 include circuits and circuitry as well as electronic devices such as an electronic control unit (ECU) or "electronic controller" 62, which is configured to control the operation of the pest control device 14. The ECU 62 is illustratively embodied as a lower-power microcontroller device such as a MSP430 Series microcontroller, which is commercially available from Texas Instruments of Dallas, Tex. In other embodiments, other commercially-available microcontrollers, discrete processing circuits (e.g., a collection of logic devices), general purpose integrated circuit(s), and/or application specific integrated circuit(s) (i.e., ASICs) may be used to control the operation of the pest control device 14. In the illustrative embodiment, the other electrical components 54, including the LEDs 56, 58, are electrically connected with the ECU 62 via a number of communication links 64 such as printed circuit board traces, wires, cables, and the like.

The electrical components 54 include a transceiver array 66 that is connected to the antenna 18 via the connector 44. The transceiver array 66 is configured to transmit and/or receive data for the ECU 62 using a radio frequency over a local area network (LAN). In the illustrative embodiment, the transceiver array 66 is capable of communication in the unlicensed 915 MHz Industrial, Scientific, and Medical (ISM) frequency band. As such, the transceiver array 66 may include any number of circuits and electronic devices (e.g., an RF transceiver and duplexer). In the illustrative embodiment, the RF transceiver of the array 66 is a low power transceiver such as, for example, a Simplelink CC1200 RF Transceiver, which is commercially available from Texas Instruments of Dallas, Tex. It should be appreciated that in other embodiments the transceiver array may be configured to transmit and receive using a cellular network. In other embodiments, the pest sensor may include a separate transmitter and receiver for transmitting and receiving data from the remote system. In still other embodiments, the pest sensor may be configured to be hardwired to a communication network via a cable.

Figure 5:
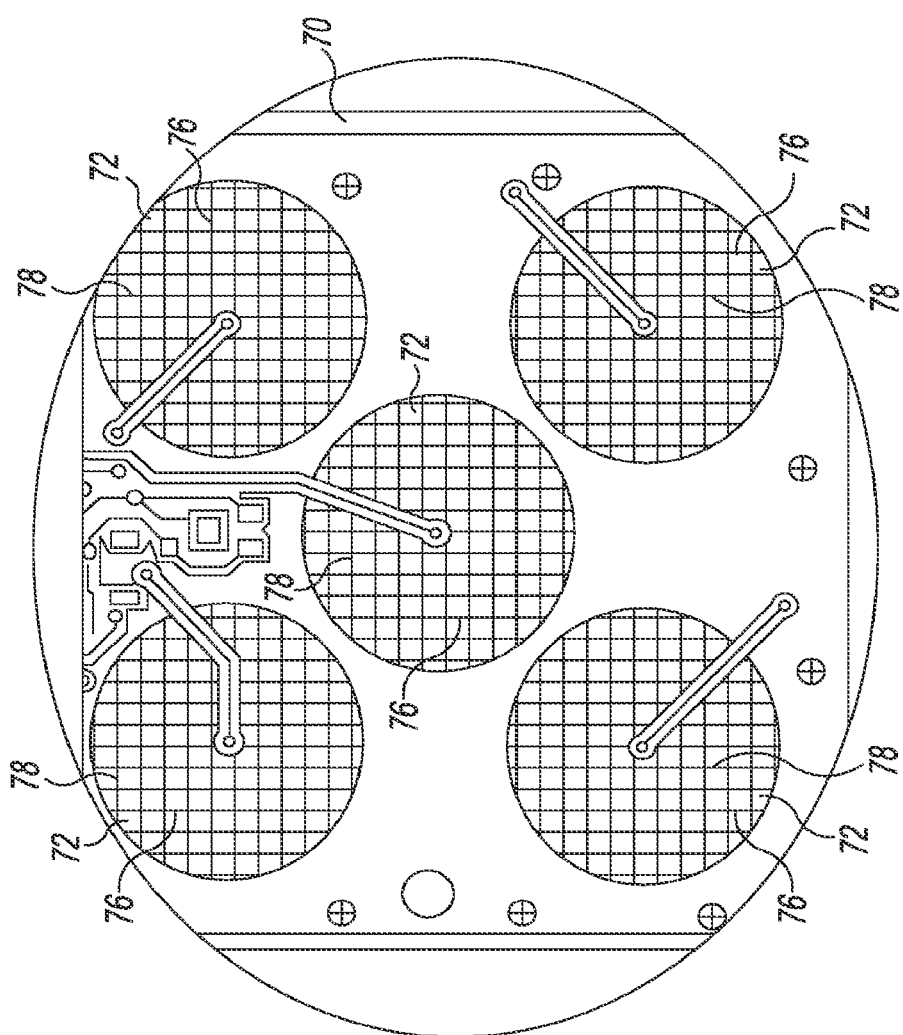
FIG. 5 is a plan view of a capacitive sensor array of the pest control device of FIG. 3.

As shown in FIG. 4, the pest control device 14 includes a capacitive sensor array 70 that is configured to generate electrical output signals when a rodent passes over the pest control device 14. The sensor array 70 illustratively includes five sensor pads 72, which are arranged in a "X" pattern similar to the "5" face of a gaming dice. Each pad 72 is substantially circular and is connected to a specific pin of the ECU 62 via a relaxation oscillator circuit (not shown). Each pad 72 is also configured to provide higher sensitivity on the side 74, which faces toward the top surface 60 of the casing 52 (i.e., the surface contacted by the rodent), and less sensitivity on the side 76 (see FIG. 5) facing away from that surface. In the illustrative embodiment, the difference in sensitivity is accomplished through selection of the pad diameter, spacing between the pad and adjacent ground area, and the addition of a grounding pattern on the side 76 of each pad 72. As shown in FIG. 5, the grounding pattern takes the form of a cross-hatch pattern 78. It should be appreciated that other sensor array may be used in other embodiments.

Each pad 72 of the array 70 is formed from copper, but, in other embodiments, Indium tin oxide (ITO) and printed ink may be used. In the illustrative embodiment, the array 70 is configured to generate an electrical output signal when an object (such as a rodent) passes over one of the pads 72, thereby changing the dielectric field between the pad 72 and its ground layer. A signal corresponding to the change in the dielectric field is communicated to the ECU 62, which uses that information as described in greater detail below.

As shown in FIG. 4, the pest control device 14 also includes a number of environmental sensors to provide information about the monitoring location and the pest control device 14. The environmental sensors include a temperature sensor 80 configured to measure the temperature of the environment surrounding the station 10. In the illustrative embodiment, the temperature sensor is a digital sensor such as, for example, the STLM75, which is commercially available from STMicroelectronics. The temperature sensor 80 is configured to take a temperature measurement and transmit a signal indicative of that measurement to the ECU 62.

The electrical components 54 of the control device 14 also include a position/orientation sensor 84 configured to detect movement of the station 10. In the illustrative embodiment, the orientation sensor 84 is a 3-axis digital accelerometer such as, for example, the MMA8652, which is commercially available from Freescale. The sensor 84 detects movement of the control device 14 and transmits a signal indicative of that movement to the ECU 62. When the sensor 84 is positioned in the station 10 and the station 10 is moved, the sensor 84 detects that movement and transmits its signal to the ECU 62. The sensor 84 may also be configured to detect entry of the rodent into the station 10 and/or the closing of a rodent trap.

In other embodiments, the position sensor 84 may be a Hall-Effect sensor that detects the proximity of the sensor 84 (and hence the station 10) to a magnetic anchor secured to the ground or otherwise separated from the station 10. In such embodiments, movement of the station 10 relative to the magnetic anchor causes the sensor 84 to generate a signal indicative of that movement and transmit that signal to the ECU 62. When a magnetic anchor is incorporated into the housing 12, the Hall-Effect sensor may also be used to determine if the position sensor 84 is properly positioned in the station 10. It should be appreciated that in other embodiments the position sensor 84 may be omitted.

It should be appreciated that in other embodiments the pest control device 14 may include other environmental sensors 82. Such sensors 82 may measure humidity, air quality, dampness, or other factors that may affect the operation of the control device 14, the status of the bait 20, and/or the state of the station 10.

As shown in FIG. 4, the control device 14 is powered by a local battery 86. In the illustrative embodiment, the battery 86 is a lithium thionyl chloride battery that is not replaceable. It should be appreciated that in other embodiments other battery types may be used. In still other embodiments, the control device 14 may utilize an external power source.

The control device 14 also includes a proximity sensor 88 configured to detect a magnetic source such as, for example, a magnetic wand that may be present during maintenance. In the illustrative embodiment, the proximity sensor 88 is a Hall-Effect sensor that generates a signal to indicate the presence of the magnetic source and transmit that signal to the ECU 62. It should be appreciated that other embodiments may implement a different detection mechanism that includes additional or fewer components to detect the presence of rodents in the station 10.

As described above, the electrical components 54 are connected to, and communicate with, the ECU 62, which is, in essence, the master computer responsible for interpreting electrical signals sent by sensors associated with the control device 14 and for activating or energizing electronically-controlled components associated with control device 14. For example, the ECU 62 is configured to control operation of the LEDs 56, 58 and the transceiver array 66. The ECU 62 also monitors various signals from the capacitive sensor array 70 and the sensors 80, 84, 88 and determines when various operations of the control device 14 should be performed. As will be described in more detail below with reference to FIGS. 6-7, the ECU 62 is operable to control the components of the control device 14 such that the pest activity and other information about the station 10 are communicated to the remote system 16.

To do so, the ECU 62 includes a number of electronic components commonly associated with electronic units utilized in the control of electromechanical systems. For example, the ECU 62 includes, amongst other components customarily included in such devices, a processor such as a microprocessor 90 and a memory device 92 such as a programmable read-only memory device ("PROM") including erasable PROM's (EPROM's or EEPROM's). The memory device 92 is provided to store, amongst other things, instructions in the form of, for example, a software routine (or routines) which, when executed by the microprocessor 90, allows the ECU 62 to control operation of the control device 14.

The ECU 62 also includes an analog interface circuit 94. The analog interface circuit 94 converts the output signals from various sensors (e.g., the proximity sensor 88 and capacitive sensor array 70) into signals which are suitable for presentation to an input of the microprocessor 90. In particular, the analog interface circuit 94, by use of an analog-to-digital (A/D) converter (not shown) or the like, converts the analog signals generated by the sensors into digital signals for use by the microprocessor 90. It should be appreciated that the A/D converter may be embodied as a discrete device or number of devices, or may be integrated into the microprocessor 90. For those sensors of the control device 14 that generate a digital output signal, the analog interface circuit 94 may be bypassed.

Similarly, the analog interface circuit 94 converts signals from the microprocessor 90 into output signals which are suitable for presentation to the electrically-controlled components of the control device 14 (e.g., the LEDs 56, 58). In particular, the analog interface circuit 94, by use of a digital-to-analog (D/A) converter (not shown) or the like, converts the digital signals generated by the microprocessor 90 into analog signals. It should be appreciated that, similar to the A/D converter described above, the D/A converter may be embodied as a discrete device or number of devices, or may be integrated into the microprocessor 90. For those electronically-controlled components that operate on a digital input signal, the analog interface circuit 94 may be bypassed.

Thus, the ECU 62 may control the operation of the control device 14. In particular, the ECU 62 executes a routine including, amongst other things, a control scheme in which the ECU 62 monitors outputs of the sensors associated with the control device 14 to control the inputs to the electronically-controlled components associated therewith. To do so, the ECU 62 communicates with the sensors associated with the control device 14 to determine, amongst numerous other things, the state of the pads 72, the temperature of the environment, movement of the device 14, and so forth. Armed with this data, the ECU 62 performs numerous calculations, either continuously or intermittently, including looking up values in preprogrammed tables, in order to execute algorithms to perform such functions as transmitting or receiving data from the remote system 16, energizing the LEDs 56, 58, etcetera. It should be appreciated that in other embodiments, the ECU may be implemented as field programmable gate array (FPGA) or other programmable logic device, a digital signal processor (DSP), an application specific integrated circuit (ASIC), or any other configuration that is designed to perform the functions described herein.

To conserve battery power, the ECU 62 is configured to enter a reduced power mode between operations. In the illustrative embodiment, the ECU 62 is configured to exit the reduced power mode every 100 milliseconds and execute a control routine similar to the control routine 100 illustrated in FIG. 6. It should be appreciated that while the operation blocks of the routine 100 are shown in sequence, the ECU 62 may perform one or more of the operations depicted therein simultaneously or in an order different from that shown in FIG. 6. It should also be appreciated that in other embodiments one or more of the operation blocks may be omitted.

The routine 100 begins with block 102 in which the ECU 62 monitors the capacitive sensor array 70 and determines if there is any activity. To do so, the ECU 62 executes the sub-routine 200 illustrated in FIG. 7. The sub-routine 200 begins with block 202 in which the ECU 62 measures the capacitance of each of the pads 72 of the capacitive sensor array 70. In block 202, the ECU 62 separately measures the frequency of each of the five relaxation oscillator circuits connected to each pad 72. The frequency of each oscillator circuit is inversely related to the capacitance between its corresponding pad 72 and ground area. As described above, when a rodent is proximate to, or passes over, a pad 72, the dielectric constant of the capacitor formed by that pad 72 and the ground area is affected, thereby changing the capacitance of the capacitor and hence the frequency output of the oscillator circuit. After the ECU 62 has measured the capacitance of each of the pads 72, the sub-routine 200 advances to block 204.

In block 204, the ECU 62 calculates a new baseline for each pad 72 based on the measured capacitance for that pad. In the illustrative embodiment, the ECU 62 is configured to execute Equations (1) and (2) below, which use a programmable time constant (Kf) to change the rate at which the baselines are adapted to the environment.

$$A(\text{new}) = A(\text{old}) - A(\text{old}) * \left(\frac{Kf}{2^{16}}\right) + \text{Measured Capacitance} \quad (1)$$

$$\text{Baseline} = A(\text{new}) * \left(\frac{Kf}{2^{16}}\right) \quad (2)$$

Each baseline value and each value of variable A(new) is stored in memory for future use by the ECU 62. As described in greater detail below, the parameter Kf may be changed or updated by the remote system 16 based on environmental factors and past activity recorded by the pest control device 14.

In block 206, the ECU 62 compares each capacitance measured in block 202 against the corresponding new/adapted baseline value calculated in block 204 and calculates the differences between those values. The comparison of each capacitance measured in block 202 against an adapted baseline value enables the sensor to adapt to gradual changes in its environment while retaining the necessary sensitivity and precision to detect pest activity. In that way, the ECU 62 obtains five difference values, one for each pad 72. The sub-routine 200 then advances to block 208.

In block 208, the ECU 62 determines whether any of the calculated differences exceed a stored "Pest Value" threshold. The Pest Value threshold is programmable and is determined based on, among other things, the nature of the rodent and environment surrounding the station. The Pest Value threshold may be changed or updated by the remote system 16 based on environmental factors and past activity recorded by the pest control device 14. Each pad 72 may have the same or a different Pest Value threshold. When no calculated difference exceeds its corresponding Pest Value threshold, the sub-routine 200 ends. When at least one calculated difference exceeds its corresponding Pest Value threshold, the sub-routine 200 advances to block 210.

In block 210, the ECU 62 determines whether any of the calculated differences exceed a stored "Human Value" threshold. The Human Value threshold is programmable and is used to determine whether a service person or other individual is deliberately interacting with the pest control device 14. The Human Value threshold may be changed or updated by the remote system 16. Each pad 72 may have the same or a different Human Value threshold. When no calculated difference exceeds its corresponding Human Value threshold, the sub-routine 200 advances to block 212. When at least one calculated difference exceeds its corresponding Human Value threshold, the sub-routine 200 advances to block 214.

The ECU 62 updates software counters for the pads 72 in block 212, and the sub-routine 200 advances to block 216. In block 216, the software counter associated with each pad 72 is compared against a Counter Limit parameter stored in memory. The Counter Limit parameter may be changed or updated by the remote system 16. Each pad 72 may have the same or a different Counter Limit parameter. If any of the counters exceed their corresponding Counter Limit, the ECU 62 records a pest event in memory in block 218 and activates one or both of the LEDs 56, 58 in block 220 to visually indicate detection of a pest, as described in greater detail below. In that way, a pest event may be recorded even if the rodent contacts a single pad 72. If all of the counters are less than their corresponding Counter Limit, the sub-routine 200 ends.

As described above, the sub-routine 200 advances to block 214 when at least one difference between a pad capacitance and its baseline exceeds a corresponding Human Value threshold. In block 214, the ECU 62 executes an algorithm to determine the sequence of pad hits or contacts. That sequence is compared in block 222 to a predetermined sequence of individual pad hits that is unlikely to occur when a rodent is in proximity to the control device 14. For example, in the illustrative embodiment, the sequence of hits may correspond to a human swiping a finger across the capacitive sensor array 70 to draw the letter "X" (indicating hits to all five pads). In other embodiments, the sequence may correspond to other geometric shapes such as, for example, a square (indicating hits to the four outer pads). When the contact sequence matches the predetermined sequence, the sub-routine 200 advances to block 224. When the contact sequence is different from the predetermined sequence, the sub-routine 200 ends. In other embodiments, the sub-routine 200 may advance to block 212 to increment the software counter associated with a possible pest event.

In block 224, the ECU 62 records a service event in memory, and the subroutine 200 advances to block 220 in which the ECU 62 energizes one or both of the LEDs 56, 58 to provide a visual indication of the detection of the service event. For example, only the green LED 58 is energized to indicate the successful detection of a service event or other human interaction with the control device 14. In response to detecting a pest event in block 218, both LEDs 56, 58 are energized to flash simultaneously.

Figure 6:
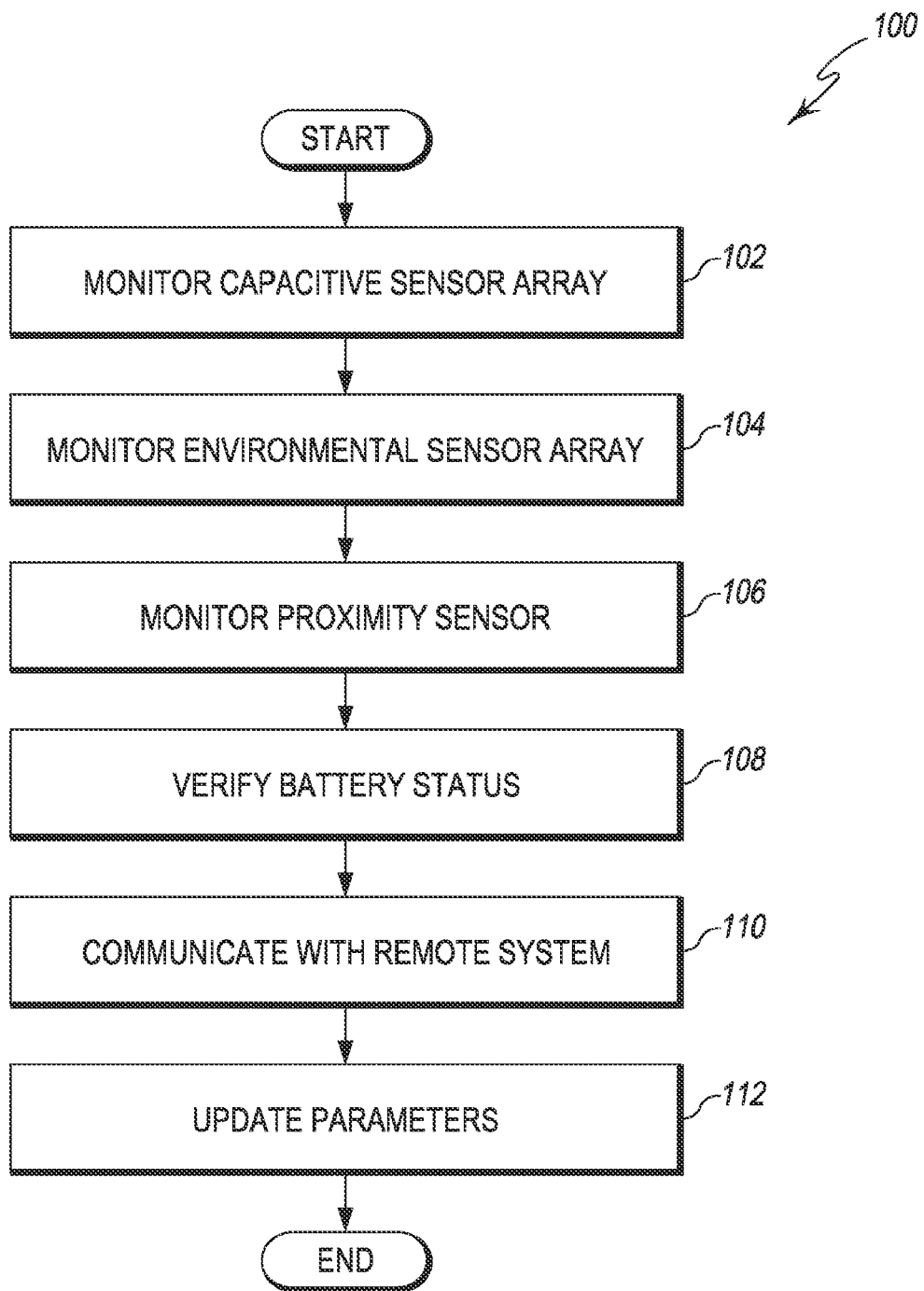
FIG. 6 is a simplified flow chart of a control routine of the pest control device of FIG. 3.
Figure 7:
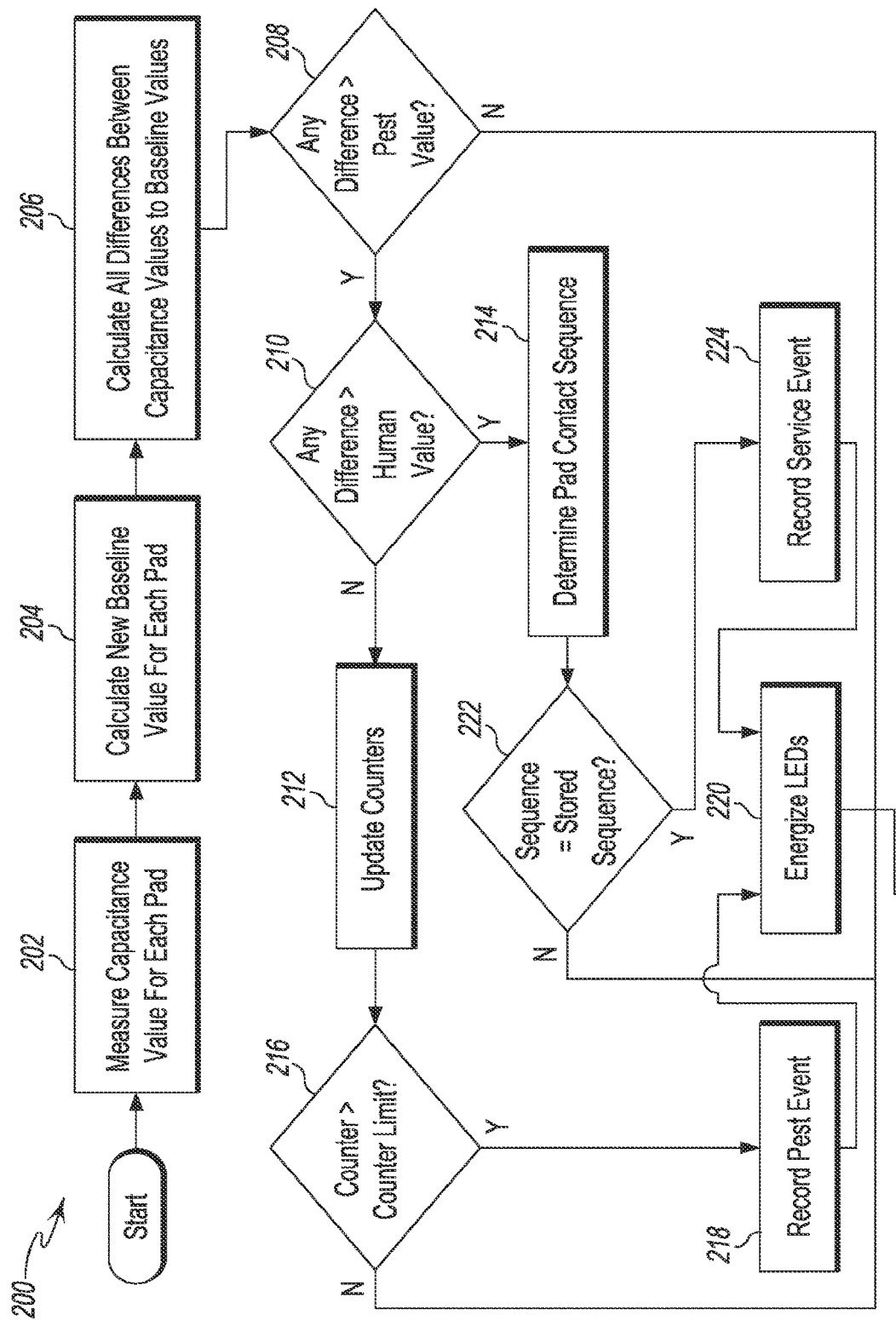
FIG. 7 is a simplified flow chart of one embodiment of a sub-routine of the control routine of FIG. 6.

At the end of the sub-routine 200, the routine 100 may advance to block 104, as shown in FIG. 6. In block 104, the ECU 62 monitors the various environmental sensors, including the temperature sensor 80 and the position sensor 82. To do so, the ECU 62 accesses the data from the temperature sensor 80 and stores a temperature value in memory. The ECU 62 also accesses the data received from the accelerometer 84. If the data received from the accelerometer 84 indicates movement, the ECU 62 records the event in memory. The routine 100 may then advance to block 106.

In block 106, the ECU 62 monitors the magnetic proximity sensor 88. If the sensor 88 determines the presence of a magnetic source such as, for example, a magnetic wand, the ECU 62 records a service event in memory. The ECU 62 also activates one or both of the LEDs 56, 58 in a predetermined sequence to indicate that the control device 14 detected the event. In some embodiments, the ECU 62 may also be configured to clear all of the counters when the magnetic source is detected. The routine 100 may then advance to block 108.

In block 108, the ECU 62 samples the voltage of the battery 86 using the analog interface circuit 94. The measured voltage is then compared to thresholds stored in memory using an algorithm to determine the approximate state of the charge of the battery 86. The state of the charge may then be stored in memory. The routine 100 may then advance to block 110.

In block 110, the pest control device 14 communicates with the remote system 16. The remote system 16 includes communications middleware, database, and application software and may be located on site with the pest control device 14 or off site. A range extender may be used to extend a range of a wireless network to transmit data received from the pest control device. The remote system 16 may also include a base station, which may include a transceiver that receives data directly from the pest control device or indirectly via the range extender and transmits data to a network-based utility via a cellular wireless network. The base station may also receive data from the network-based utility and transmit that data to the pest control device directly or indirectly via the range extender. The network-based utility may be further integrated with different interfaces, such as a management portal, mobile service interfaces, or billing interface. Through these interfaces, the data may be further processed, analyzed, stored, or further transmitted to web or mobile services. One example of a network-based utility is MeshVista®, which is commercially available by Mesh Systems™.

To transmit its data to the remote system 16, the ECU 62 energizes the transceiver array 66 to establish contact with the remote system 16 via the local area network (LAN). The transmitted data may include, among other things, the recorded pest events, service events, temperature measurements, records of movement, the baseline values for the pads 72, the state of the charge of the battery 86, and so forth. The pest control device 14 may also transmit an indication of the health of the LAN communications infrastructure. The pest control device 14 further energizes and de-energizes the LEDs 56, 58 depending on its connection to the network. For example, the LED 58 may be flashed for a ten second interval to indicate a successful connection, while the LED 56 may be flashed for a ten second interval to indicate no connection with the network.

The remote system 16 may then interpret the data and transmit updated parameters back to the control device 14. The remote system 16 may update, for example, the Pest Value threshold if a number of false positives have been logged at the control device 14. The updated parameters may include the programmable constant Kf, the Human Value threshold, the Pest Value threshold, and the software counter limit for each pad. Additionally, the remote system 16 may change the predetermined sequence of pad contacts used to indicate a service event. The ECU 62 updates the parameters stored in memory in block 112 before returning to the reduced power mode.

Figure 8:
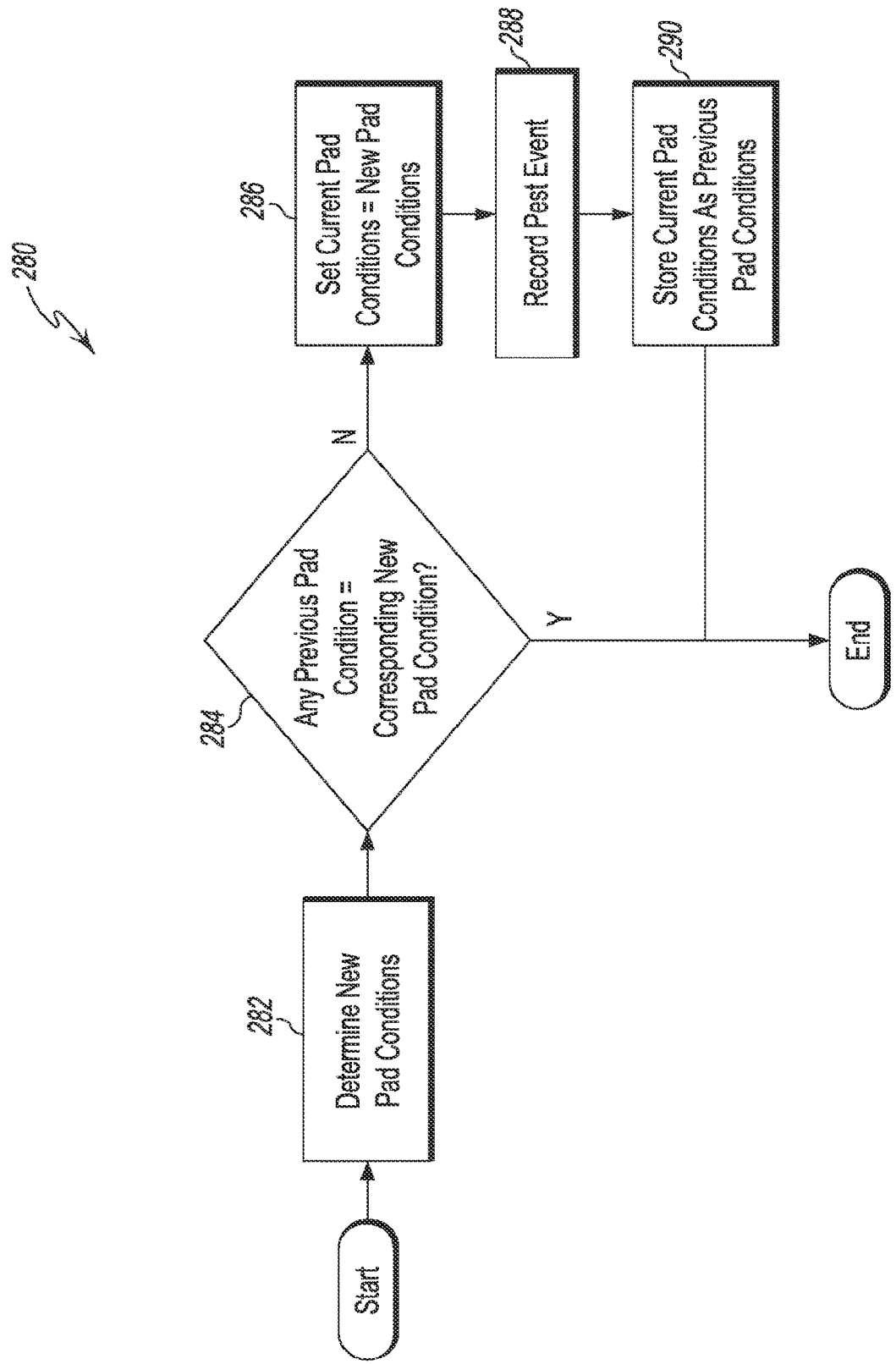
FIG. 8 is a simplified flow chart of another embodiment of a sub-routine of the control routine of FIG. 6.

As described above, the routine 100 includes a block 102 in which the ECU 62 monitors the capacitive sensor array 70 and determines if there is any activity. It should be appreciated that the routine 100 may include other sub-routines that may be executed by the ECU 62 to determine if there is activity at a particular sensor. One such sub-routine (hereinafter sub-routine 280) is shown in FIG. 8. The sub-routine 280 begins with block 282 in which the ECU 62 determines the condition of each pad 72 of the capacitive sensor array 70. In the illustrative embodiment, the new pad conditions may be "Active," indicating the presence of pest activity, or "Inactive," indicating no pest activity. To determine the new pad condition for each pad 72, the ECU 62 may execute sub-routine 300 illustrated in FIG. 9, which is described in greater detail below.

After the ECU 62 determines the new pad condition for each pad 72, the sub-routine 280 advances to block 284 in which the new pad condition for each pad 72 is compared to the previous pad condition for that pad. To do so, the ECU 62 may retrieve the previous conditions for the array 70 that are stored in memory 92 and compare the previous conditions to the new conditions. If the new condition of any pad 72 is not equal to the previous condition recorded for that pad, the sub-routine 280 advances to block 286. For example, if the new condition for one pad 72 is "Inactive" and the previous condition was recorded as "Active" for that pad, the sub-routine 280 would advance to block 286, even if the new conditions for the other pads were the same as their corresponding previous conditions. In that way, the change of condition of just one pad will advance the sub-routine 280 to block 286. If the new conditions of all of the pads 72 are the same as the previous conditions stored in memory, the sub-routine 280 ends, and the routine 100 may advance to block 104, which is described above.

In block 286 of the sub-routine 280, the ECU 62 sets the current pad condition for each pad 72 equal to the new condition determined for that pad in block 282, and the sub-routine 280 advances to block 288. In block 288, the ECU 62 records a pest event if one of the current pad conditions set in block 286 is labeled "Active." If all of the current pad conditions are labeled "Inactive," the ECU 62 does not record a pest event.

At the completion of block 288, the sub-routine 280 advances to block 290 in which the ECU 62 stores the current pad conditions as previous pad conditions in the memory 92. In that way, the conditions are available for use when the ECU 62 next executes the sub-routine 280. The sub-routine 280 then ends, and the routine 100 may advance to block 104.

Figure 9:
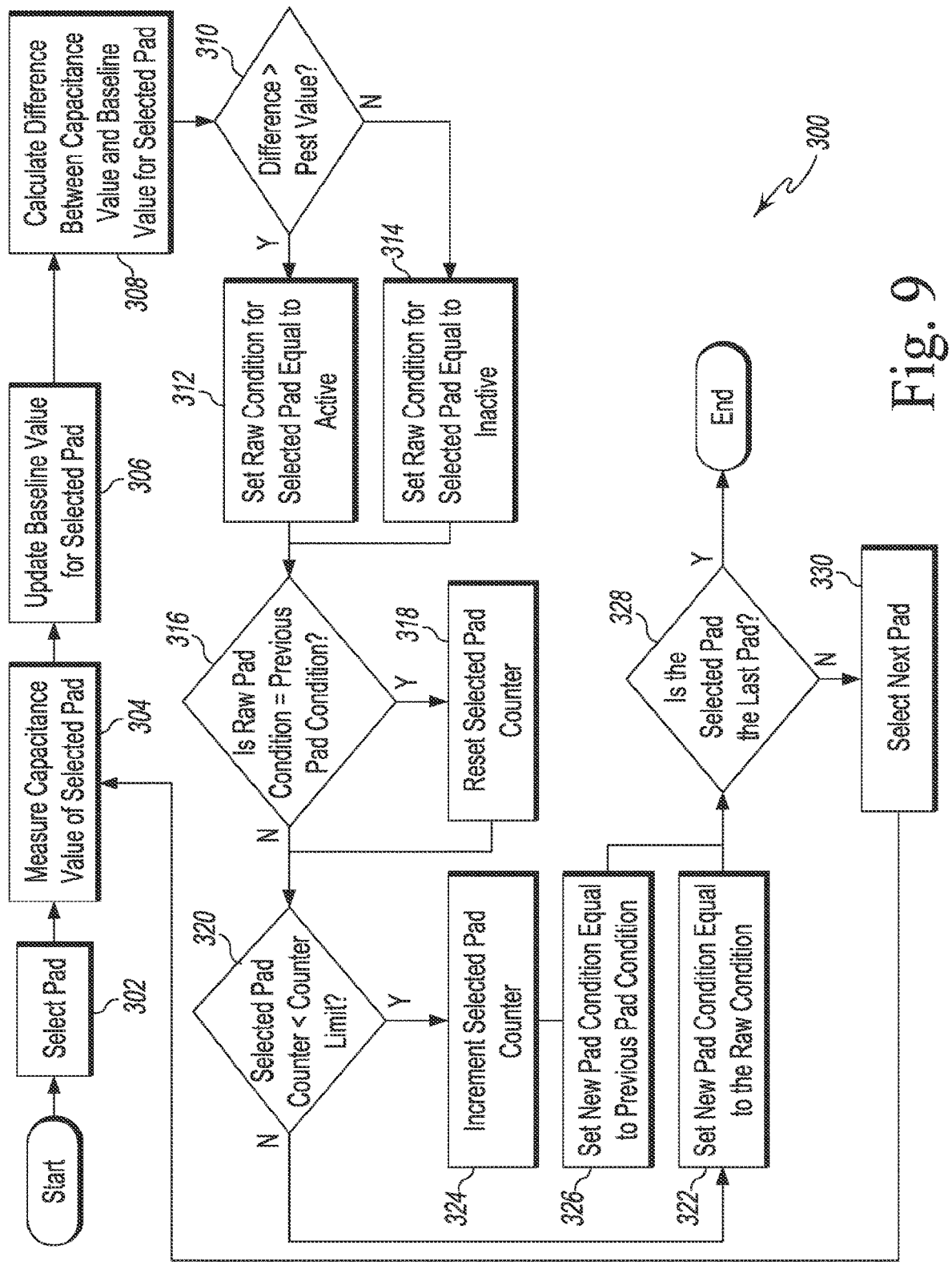
FIG. 9 is a simplified flow chart of a further sub-routine of the sub-routine of FIG. 8.

Referring now to FIG. 9, an exemplary sub-routine 300 for use in determining new pad conditions in block 282 of the sub-routine 280 is shown. The sub-routine 300 begins with block 302 in which the ECU 62 selects one of the pads 72 of the capacitive sensor array 70 to query. With that pad 72 selected, the sub-routine 300 proceeds to block 304. In block 304, the ECU 62 measures the frequency of the relaxation oscillator circuit connected to the selected pad 72. As described above, the frequency of each oscillator circuit is inversely related to the capacitance between the selected pad 72 and ground area. After the ECU 62 has measured the capacitance of the selected pad 72, the sub-routine 300 advances to block 306.

In block 306, the ECU 62 calculates a new baseline for the selected pad 72 based on the capacitance measured in block 304. To do so, the ECU 62 may use Equations (1) and (2) presented above to obtain a baseline value that is adapted to the environment. After the ECU 62 calculates the new baseline, the sub-routine 300 advances to block 308 in which the ECU 62 compares the capacitance value measured in block 304 against the new/adapted baseline value calculated in block 306. The ECU 62 calculates the difference between those values, and the sub-routine 300 then advances to block 310.

In block 310, the ECU 62 determines whether the calculated difference exceeds a stored "Pest Value" threshold. Like the sub-routine 200, the Pest Value threshold of the sub-routine 300 is programmable and is determined based on, among other things, the nature of the rodent and environment surrounding the station. The Pest Value threshold may be changed or updated by the remote system 16 based on environmental factors and past activity recorded by the pest control device 14. Each pad 72 may have the same or a different Pest Value threshold. When the calculated difference for the selected pad 72 exceeds the Pest Value threshold for that pad, the sub-routine 300 advances to block 312. When the calculated difference is less than the Pest Value threshold, the sub-routine 300 advances to block 314.

In block 312, the ECU 62 sets a variable—identified in FIG. 9 as "raw condition"—to "Active" when the calculated difference for the selected pad 72 exceeds the Pest Value threshold for that pad. If executing the alternative block 314, the ECU 62 sets the raw condition for the selected pad 72 to "Inactive" because the calculated difference is less than the Pest Value threshold. After completing either block 312 or block 314, the sub-routine 300 advances to block 316.

In block 316, the ECU 62 compares the raw condition to the previous pad condition for the selected pad 72. As described above, the previous pad conditions for the capacitive sensor array 70 are stored in the memory 92. The ECU 62 retrieves the previous pad condition for the selected pad 72 from memory and compares it to the raw condition. If the raw pad condition is equal to or the same as the previous pad condition, the sub-routine 300 advances to block 318 in which the ECU 62 resets the software counter for the selected pad 72 to zero, and the sub-routine 300 advances to block 320. If the raw pad condition for the selected pad 72 is not equal to or the same as the previous pad condition, the sub-routine 300 advances directly from block 316 to block 320.

In block 320, the software counter associated with the selected pad 72 is compared against a Counter Limit parameter stored in memory. The Counter Limit parameter may be changed or updated by the remote system 16, and each pad 72 may have the same or a different Counter Limit parameter. If the counter for the selected pad 72 exceeds its corresponding Counter Limit, the sub-routine 300 advances to block 322. If the software counter for the selected pad 72 is less than its corresponding Counter Limit, the sub-routine 300 advances to block 324.

In block 322, the ECU 62 sets a new condition for the selected pad 72 equal to the raw condition of that pad. For example, if the raw condition is equal to "Active," the ECU 62 sets the new pad condition to "Active." The sub-routine 300 then advances from block 322 to block 328, which is described in greater detail below.

Returning to block 320, if the software counter for the selected pad 72 is less than its corresponding Counter Limit, the sub-routine 300 advances to block 324 in which the software counter for the selected pad is incremented. The sub-routine 300 then advances to block 326 in which the ECU 62 sets the new condition for the selected pad equal to the previous condition stored in memory. The sub-routine 300 advances from block 326 to block 328.

In block 328, the ECU 62 analyzes whether it has determined new pad conditions for all of the pads 72. If the ECU 62 has not determined new pad conditions for all of the pads 72 in the array 70, the sub-routine 300 advances to block 330 in which the ECU 62 selects another pad 72, and the sub-routine 300 returns to block 304. The ECU 62 repeats blocks 304 through block 328 until new pad conditions have been determined for all of the pads 72, at which point the sub-routine 300 ends. The sub-routine 280 of FIG. 8 may then advance to block 284 of the sub-routine 280, which is described above in regard to FIG. 8.

Figure 10:
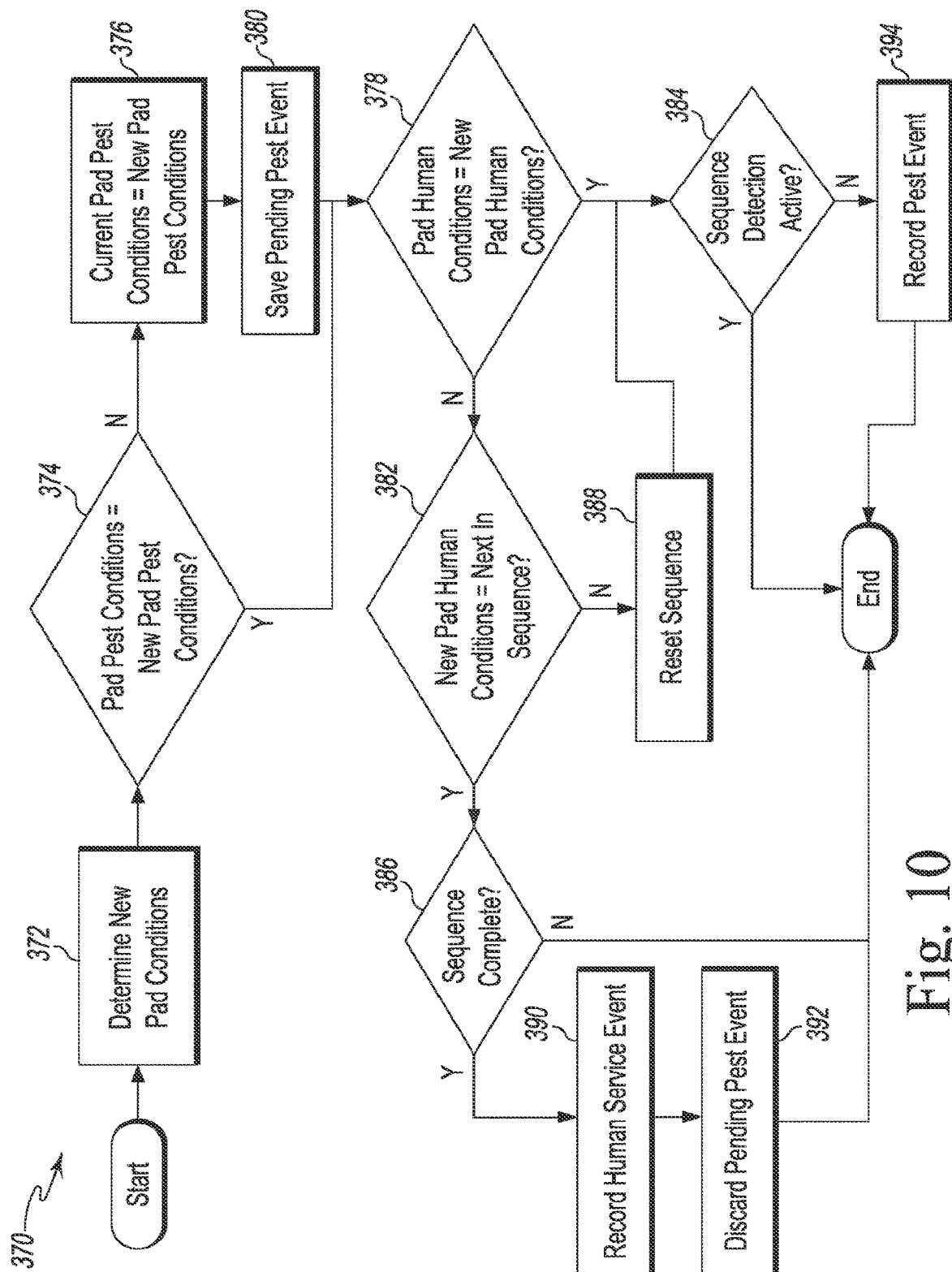
FIG. 10 is a simplified flow chart of another embodiment of a sub-routine of the control routine of FIG. 6.

Another sub-routine (hereinafter sub-routine 370) for use in determining if there is activity at a particular sensor is shown in FIG. 10. The sub-routine 370 begins with block 372 in which the ECU 62 determines the new condition of each pad 72 of the capacitive sensor array 70. In the illustrative embodiment, the new pad conditions include both pad pest conditions, which relate to possible pest activity, and pad human conditions, which relate to possible human activity. To determine the new pad conditions for the pads 72, the ECU 62 may execute sub-routine 400 illustrated in FIGS. 11a and 11b.

Figure 11A:
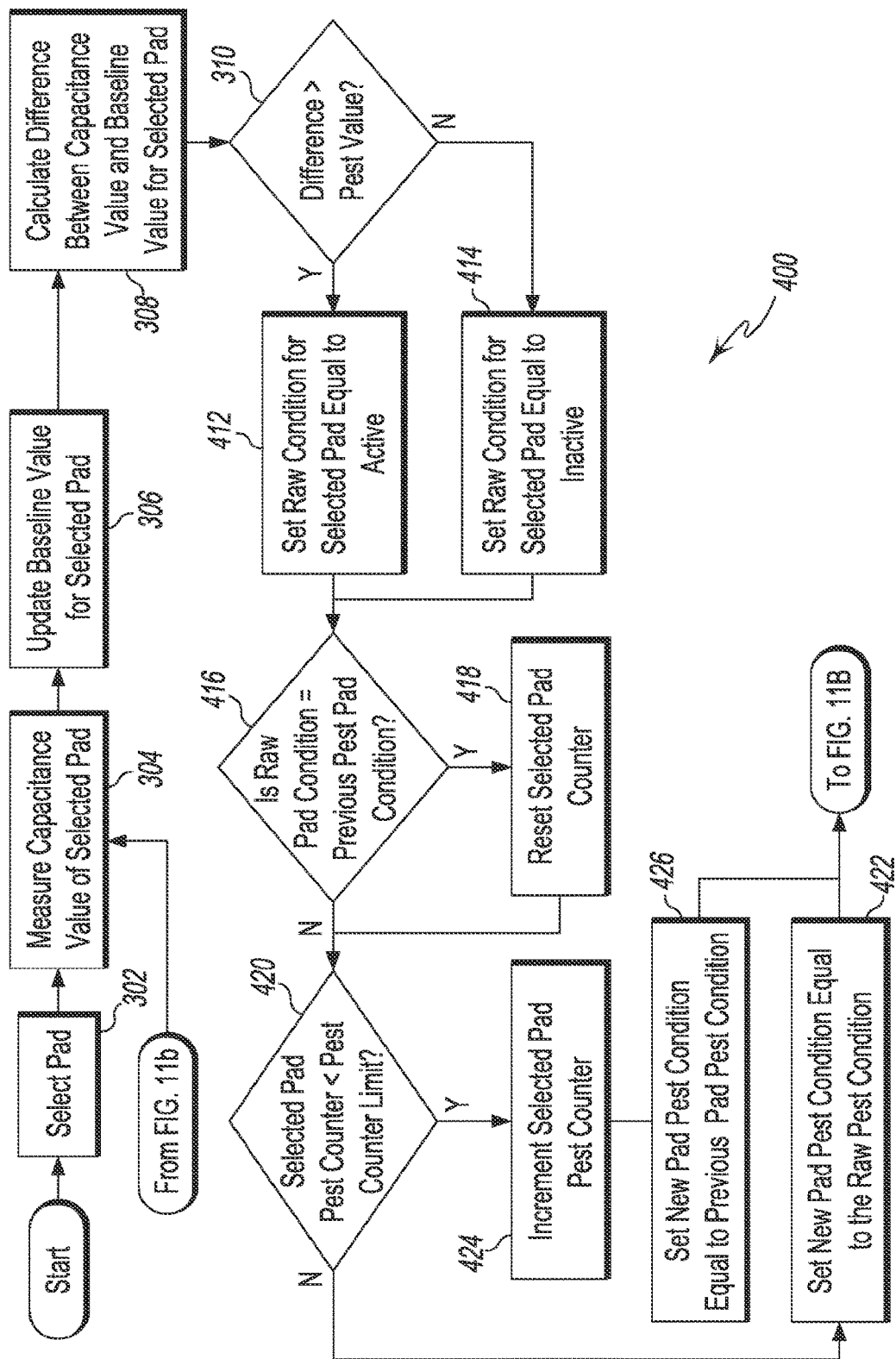
FIGS. 11a and 11b are illustrations of a simplified flow chart of a further sub-routine of the sub-routine of FIG. 10.
Figure 11B:
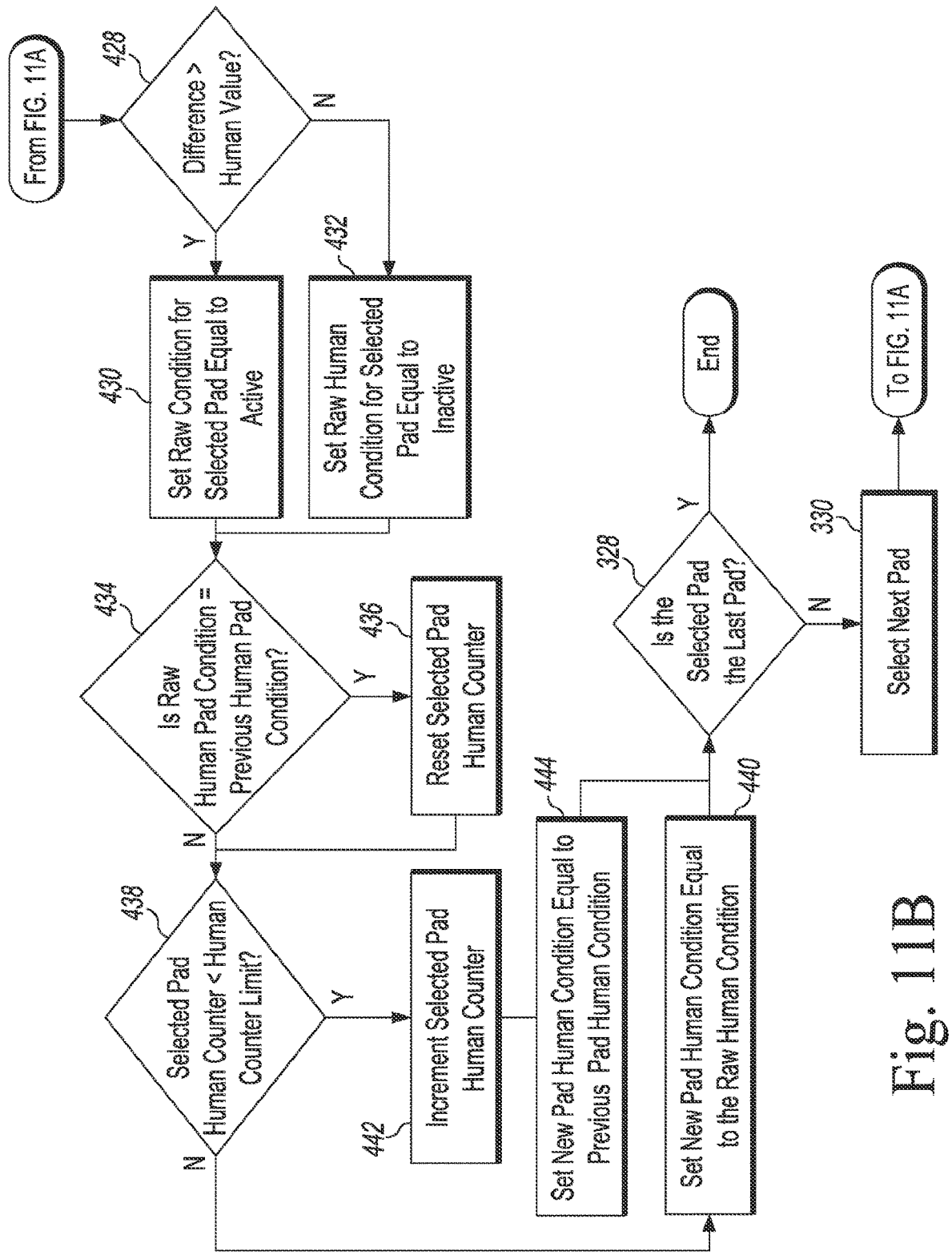

The sub-routine 400 shown in FIGS. 11a and 11b includes a number of blocks that are the same or similar to the blocks of the sub-routine 300. For such blocks, the references numbers from the sub-routine 300 described above will be used to identify those blocks in the sub-routine 400. For example, the sub-routine 400, like the sub-routine 300, begins with a block 302 in which the ECU 62 selects one of the pads 72 of the capacitive sensor array 70 to query. The sub-routine 400 then proceeds through block 304 to block 310 as shown in FIG. 11a. As described above, the ECU 62 determines in block 310 whether any of the calculated difference for the selected pad 72 exceeds a stored "Pest Value" threshold. When the calculated difference for the selected pad 72 exceeds the Pest Value threshold for that pad, the sub-routine 400 advances to block 412. When the calculated difference is less than the Pest Value threshold, the sub-routine 400 advances to block 414.

In block 412, the ECU 62 sets a variable—identified in FIG. 11a as "raw pest condition"—to "Active" when the calculated difference for the selected pad 72 exceeds the Pest Value threshold for that pad. If executing the alternative block 414, the ECU 62 sets the raw pest condition for the selected pad 72 to "Inactive" because the calculated difference is less than the Pest Value threshold. After completing either block 412 or block 414, the sub-routine 400 advances to block 416.

In block 416, the ECU 62 compares the raw pest condition to the previous pest condition for the selected pad 72. The previous pest conditions for the capacitive sensor array 70 are stored in the memory 92. The ECU 62 retrieves the previous pest condition for the selected pad 72 from memory and compares it to the raw pest condition. If the raw pest condition is equal to or the same as the previous pest condition, the sub-routine 400 advances to block 418 in which the ECU 62 resets the software pest counter for the selected pad 72 to zero, and the sub-routine 400 advances to block 420. If the raw pest condition for the selected pad 72 is not equal to or the same as the previous pest condition, the sub-routine 400 advances directly from block 416 to block 420.

In block 420, the software pest counter associated with the selected pad 72 is compared against a Pest Counter Limit parameter stored in memory. The Pest Counter Limit parameter may be changed or updated by the remote system 16, and each pad 72 may have the same or a different Pest Counter Limit parameter. If the pest counter for the selected pad 72 exceeds its corresponding Pest Counter Limit, the sub-routine 400 advances to block 422. If the software pest counter for the selected pad 72 is less than its corresponding Counter Limit, the sub-routine 400 advances to block 424.

In block 422, the ECU 62 sets a new pest condition for the selected pad 72 equal to the raw pest condition of that pad. For example, if the raw pest condition is equal to "Active," the ECU 62 sets the new pest condition to "Active." The sub-routine 400 then advances from block 422 to block 428 in FIG. 11b, which is described in greater detail below.

Returning to block 420, if the software counter for the selected pad 72 is less than its corresponding Pest Counter Limit, the sub-routine 400 advances to block 424 in which the software counter for the selected pad is incremented. The sub-routine 400 then advances to block 426 in which the ECU 62 sets the new pest condition for the selected pad equal to the previous pest condition stored in memory. The sub-routine 400 advances from block 426 to block 428 in FIG. 11b.

In block 428, the ECU 62 determines if the difference calculated in block 308 between the measured capacitance value and the baseline value for the selected pad 72 exceeds a corresponding Human Value threshold for that pad. The Human Value threshold is programmable and is used to determine whether a service person or other individual is deliberately interacting with the pest control device 14. The Human Value threshold may be changed or updated by the remote system 16. Each pad 72 may have the same or a different Human Value threshold. When the calculated difference exceeds the Human Value threshold for the selected pad 72, the sub-routine 400 advances to block 430. When the calculated difference is less than the Human Value threshold, the sub-routine 400 advances to block 432.

In block 430, the ECU 62 sets a variable—identified in FIG. 11b as "raw human condition"—to "Active" when the calculated difference for the selected pad 72 exceeds the Human Value threshold for that pad. If executing the alternative block 432, the ECU 62 sets the raw human condition for the selected pad 72 to "Inactive" because the calculated difference is less than the Human Value threshold. After completing either block 430 or block 432, the sub-routine 400 advances to block 434.

In block 434, the ECU 62 compares the raw human condition to the previous human condition for the selected pad 72. The previous human conditions for the capacitive sensor array 70 are stored in the memory 92. The ECU 62 retrieves the previous human condition for the selected pad 72 from memory and compares it to the raw human condition. If the raw human condition is equal to or the same as the previous human condition, the sub-routine 400 advances to block 436 in which the ECU 62 resets the software human counter for the selected pad 72 to zero, and the sub-routine 400 advances to block 438. If the raw human condition for the selected pad 72 is not equal to or the same as the previous human condition, the sub-routine 400 advances directly from block 434 to block 438.

In block 438, the software human counter associated with the selected pad 72 is compared against a Human Counter Limit parameter stored in memory. The Human Counter Limit parameter may be changed or updated by the remote system 16, and each pad 72 may have the same or a different Human Counter Limit parameter. If the human counter for the selected pad 72 exceeds its corresponding Human Counter Limit, the sub-routine 400 advances to block 440. If the software human counter for the selected pad 72 is less than its corresponding Counter Limit, the sub-routine 400 advances to block 442.

In block 440, the ECU 62 sets a new human condition for the selected pad 72 equal to the raw human condition of that pad. For example, if the raw human condition is equal to "Active," the ECU 62 sets the new human condition to "Active." The sub-routine 400 then advances from block 440 to block 328, which is described in greater detail below.

Returning to block 438, if the software counter for the selected pad 72 is less than its corresponding Human Counter Limit, the sub-routine 400 advances to block 442 in which the software human counter for the selected pad is incremented. The sub-routine 400 then advances to block 444 in which the ECU 62 sets the new human condition for the selected pad equal to the previous human condition stored in memory. The sub-routine 400 advances from block 444 to block 328.

In block 328, the ECU 62 analyzes whether it has determined new pad conditions for all of the pads 72. If the ECU 62 has not determined new pad conditions for all of the pads 72 in the array 70, the sub-routine 400 advances to block 330 in which the ECU 62 selects another pad 72, and the sub-routine 400 returns to block 304 in FIG. 11a. The ECU 62 repeats the process of obtaining new pad conditions until new pad conditions have been determined for all of the pads 72, at which point the sub-routine 400 ends. The sub-routine 370 of FIG. 10 may then advance to block 374 of the sub-routine 370.

Returning to FIG. 10, the sub-routine 370 advances from block 372 to block 374 in which the new pest condition for each pad 72 is compared to the previous pest condition for that pad. To do so, the ECU 62 may retrieve the previous pest conditions for the array 70 that are stored in memory 92 and compare the previous pest conditions to the new pest conditions. If the new pest condition of any pad 72 is not equal to or the same as the previous pest condition recorded for that pad, the sub-routine 370 advances to block 376. In that way, the change of pest condition of just one pad will advance the sub-routine 370 to block 376. If the new pest conditions of all of the pads 72 are the same as the previous conditions recorded in memory, the sub-routine 370 advances to block 378.

In block 376, of the sub-routine 370, the ECU 62 sets the current pest conditions equal to the new pest conditions determined in block 372, and the sub-routine 370 advances to block 380. In block 380, the ECU 62 records a pending pest event if one of the current pad pest conditions set in block 376 is labeled "Active." If all of the current pad conditions are labeled "Inactive," the ECU 62 does not record a pending pest event. The sub-routine 370 then advances to block 378.

In block 378, the ECU 62 compares the new human condition for each pad 72 to the previous human condition for that pad recorded for that pad. To do so, the ECU 62 may retrieve the previous human conditions for the array 70 that are stored in memory 92. If the new human condition of any pad 72 is not equal to or the same as the previous human condition recorded for that pad, the sub-routine 370 advances to block 382. In that way, the change of human condition of just one pad will advance the sub-routine 370 to block 382. If the new human conditions of all of the pads 72 are the same as the previous human conditions recorded in memory, the sub-routine 370 advances to block 384.

In block 382, the ECU 62 reviews all of the new human conditions for the sensor pads 72 to determine if any of the new human conditions satisfy a required sequence of pad hits or contacts. As described above, the ECU 62 may execute an algorithm to determine the sequence of pad hits or contacts. For example, in the illustrative embodiment, the sequence of hits may correspond to a human swiping a finger across the capacitive sensor array 70 to draw the letter "X" (indicating hits to all five pads). If any of the new human conditions correspond to an expected hit or contact to satisfy the sequence, the sub-routine 370 advances to block 386. If no new human conditions correspond to an expected contact to satisfy the sequence, the sub-routine 370 advances to block 388 in which the ECU 62 resets the sequence.

In block 386, the ECU 62 determines whether a combination of new human conditions and previous human conditions for the sensor array 70 completes the required sequence (i.e., indicates the presence of a human). If the sequence is completed, the sub-routine 370 advances to blocks 390, 392 in which the ECU 62 records a service event and discards the pending pest event created in block 378 so that the event is recorded only as a service event and not as a pest event. At the completion of block 392, the sub-routine 370 ends. Similarly, if the ECU 62 determines in block 386 that the sequence is not completed, the sub-routine 370 ends.

Returning to block 378, if ECU 62 determines the new human conditions of all of the pads 72 are the same as the previous human conditions recorded in memory, the sub-routine 370 advances to block 384. In block 384, the ECU 62 confirms whether it is looking for the sequence of pad hits or contacts. If it is, the sub-routine 370 ends; if it is not, the sub-routine 370 advances to block 394. In block 394, ECU 62 records a pest event based on the pending pest event recorded in block 380. The sub-routine 370 then ends. At the completion of the sub-routine 370, the routine 100 may advance to block 104, as described above.

Referring now to FIGS. 12-18, a pest control system 510 is shown with another embodiment of a pest control device (hereinafter referred to as pest control device 514) and a pest trap device 516. The embodiment of FIGS. 12-18 includes many of the same features described above in regard to FIGS. 1-11. The same reference numbers are used in FIGS. 12-18 to identify features that are the same or similar to those described above in regard to FIGS. 1-11. As shown in FIG. 12, the pest control device 514 may be coupled to a snap-type rodent trap 516 that detains and/or exterminates the rodent. In operation, the pest control device 514 includes a position or orientation sensor 84 that is operable to detect movement of the pest control device 514, as described in greater detail below, and report that movement of the pest control device 514 to a remote system 16 wirelessly via an antenna 18 to provide an indication of whether the trap 516 has been activated.

Similar to the position/orientation sensor 84 described above in regard to FIGS. 1-11, the orientation sensor 84 is a 3-axis digital accelerometer such as, for example, the MMA8652, which is commercially available from Freescale. In some embodiments, the position sensor may be operable to detect movement of a trap. In such embodiments, the position sensor may be embedded in the trap to monitor changes in condition of the trap. The position sensor may also be configured to transmit its accelerometer readings to the pest control device or directly to the system 16, via wired or wireless connection.

Figure 13:
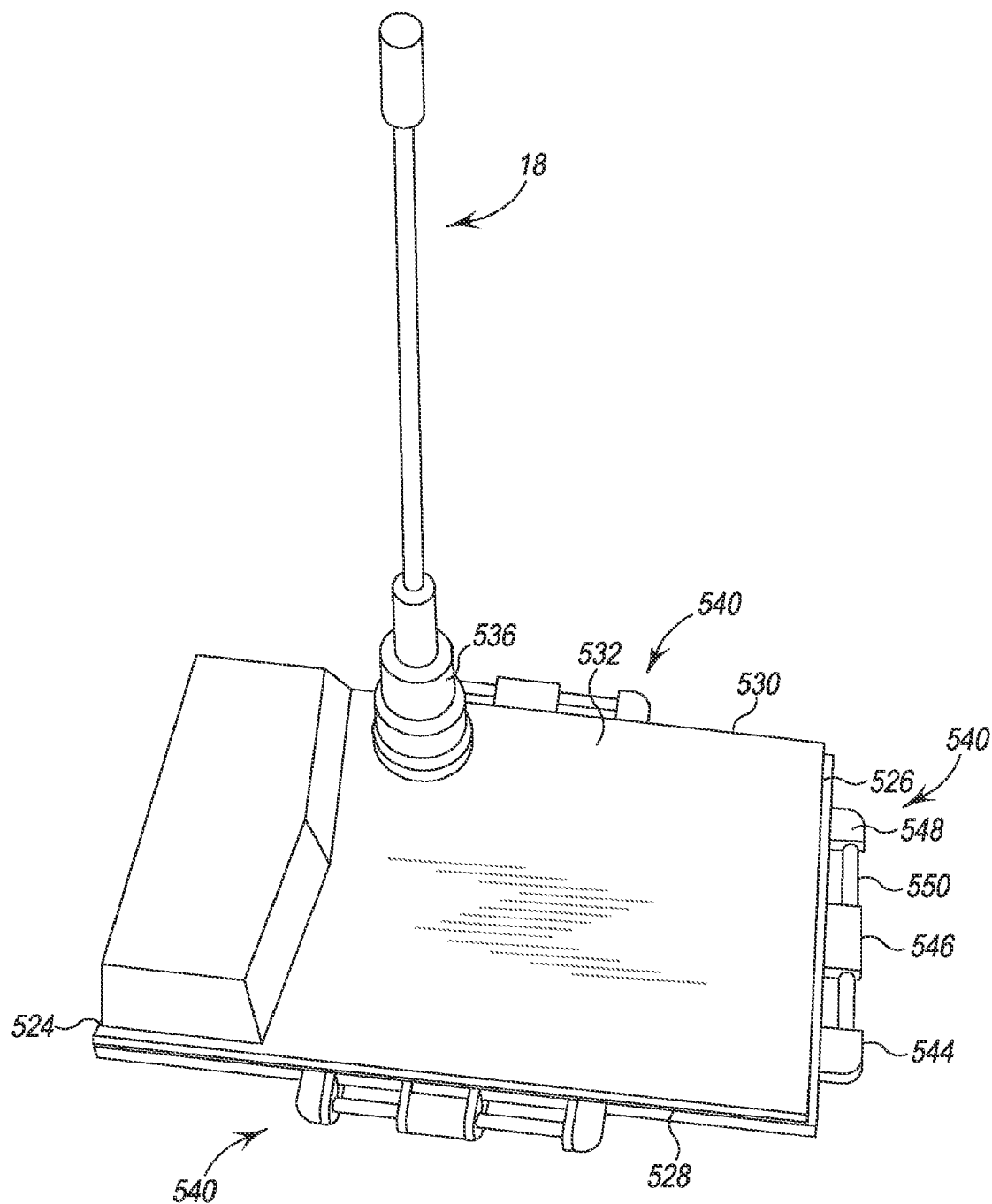
FIG. 13 is a top perspective view of a pest control device of FIG. 12.

As shown in FIGS. 12-13, the pest control device 514 includes an outer casing 520 and a hinged support leg 522 attached to the casing 520. The outer casing 520, like the casing 52 described above in regard to FIGS. 1-11, houses and protects the electrical components 54 from environmental factors, including water ingress, dust, dirt, leaves, humidity, and waste. In the illustrative embodiment, the electrical components 54 of the device 514 are the same or similar to the electrical components of the device 14, including the position sensor 84, the ECU 62, the transceiver 66, the capacitive sensing array 70, and so forth.

The outer casing 520 is generally rectangular-shaped and has two short top and bottom walls 524, 526, respectively, and two long side walls 528, 530. The antenna 18 is connected at its base to a top surface 532 of the outer casing 520 via a connector 536 to permit the device 514 to communicate with the system 16.

The outer casing 520 includes a plurality of mounting arms 540 that are positioned along the walls 526, 528, 530. Each mounting arm 540 is a possible attachment point for the support leg 522. Each arm 540 includes a plurality of posts 544, 546, 548 that extend outwardly from each of the walls 526, 528, 530. A rod 550 extends between the posts 544, 546, 548. In the illustrative embodiment, the rod 550 has a cylindrical cross-section, but it should be appreciated that in other embodiments it may have a different cross-section.

Figure 14:
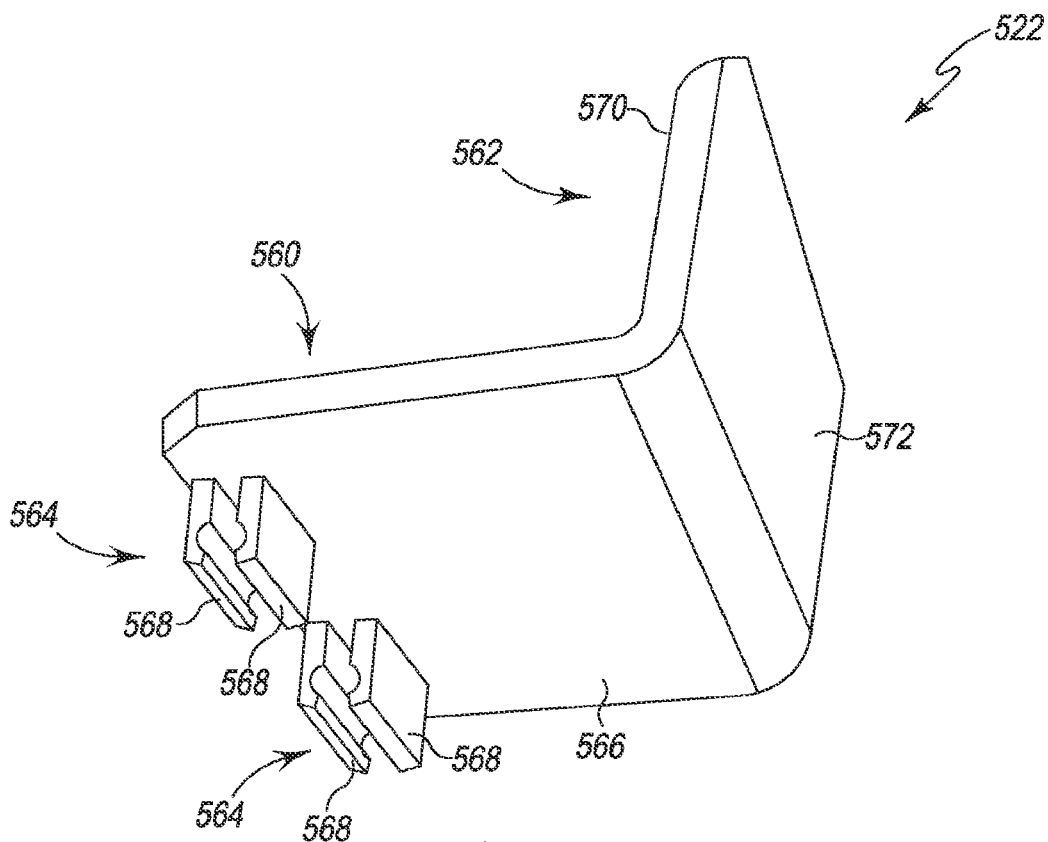
FIG. 14 is a rear perspective view of a support leg of a pest control device of FIG. 12.

As shown in FIG. 14, the support leg 522 includes a rear panel 560 that is connected to a foot panel 562. The rear panel 560 has a pair of clips 564 that extend outwardly from its back surface 566. Each clip 564 includes teeth 568 that engage the rod 550 of a mounting arm 540 to secure the support leg 522 to the pest control device 514. In the illustrative embodiment, the clips 564 are configured to engage the rod 550 such that the support leg 522 is hinged to the pest control device 514 and may pivot relative to the outer casing 522.

Figure 15:
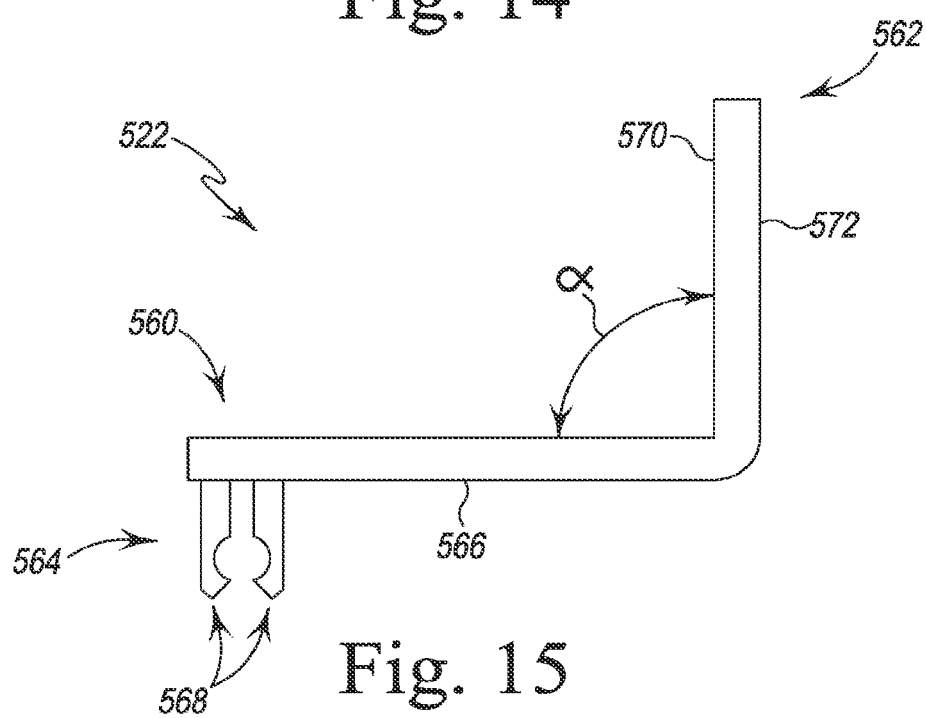
FIG. 15 is a side elevation view of the support leg of the pest control device of FIG. 12.

The foot panel 562 includes an upper surface 570 configured to be positioned below the trap 516 and a lower surface 572 positioned opposite the surface 570. In the illustrative embodiment, the surfaces 570, 572 are substantially smooth surfaces. In other embodiments, the surfaces may include grooves, ribs, or other features to grip the trap 516. As shown in FIG. 15, an angle α is defined between the foot panel 562 and rear panel 560. In the illustrative embodiment, the angle α is greater than 90 degrees.

The outer casing 520 and support leg 522 are each formed from a hard, durable plastic. In other embodiments, the casing 520 and leg 522 may be formed from any environmentally resistant material.

To set up the trap 516 relative to the control device 514, the trap 516 is placed into contact with the upper surface 570 of the support leg 522. The weight of the trap 516 forces the support leg 522 to pivot relative to the outer casing 520 and bring the lower surface 572 of the foot panel 562 into contact with the ground, as shown in FIG. 12. As the support leg 522 pivots, the wall of the outer casing 520 that is attached to the support leg 522, in this case, wall 526, is forced upward, and the outer casing 520 is positioned at a angle β relative to the ground. With the trap 516 is placed on the upper surface 570 of leg 522, the weight of the trap 516 maintains the control device 514 in the position shown in FIG. 12.

Figure 16:
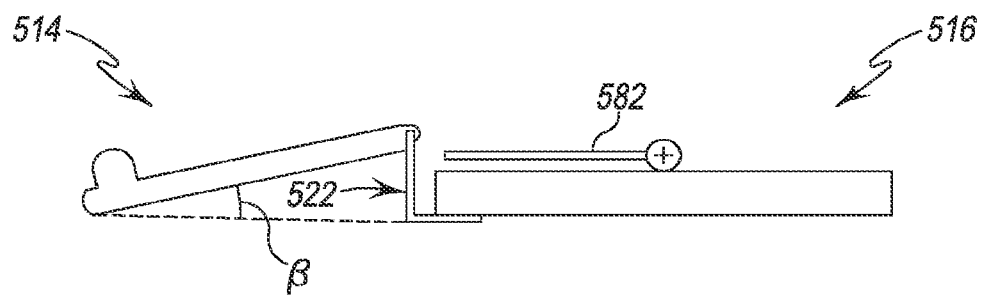
FIGS. 16-18 are side elevation views of the system of FIG. 12 in operation.
Figure 17:
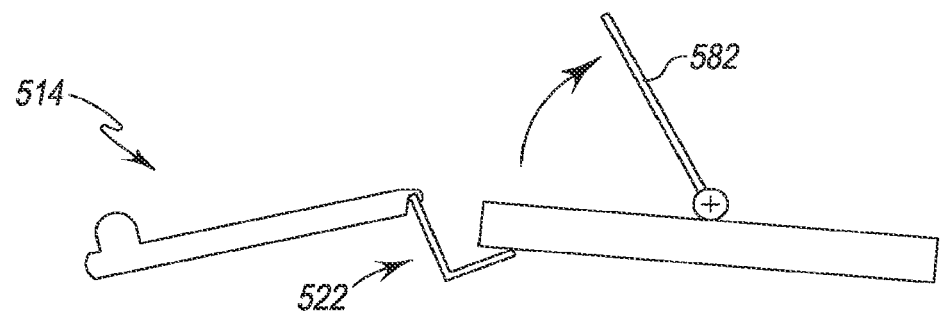
Figure 18:
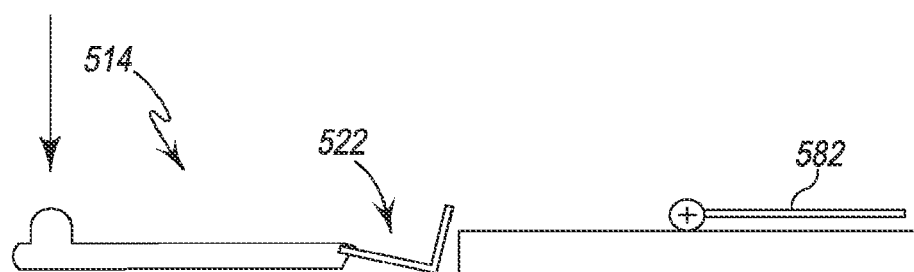

As shown in FIGS. 16-18, the snap-type rodent trap 516 can be either in an "Armed" condition (FIG. 16) or a "Tripped" condition (FIG. 18). The trap 516 includes a base 580 and a generally U-shaped jaw 582 that is pivotally coupled to a spring 584. In the "Armed" condition, the jaw 582 is held in place by a trap pin 586 such that the jaw 582 is adjacent to the pest control device 514, as shown in FIG. 16. In this configuration, if a rodent applies sufficient downward pressure on a bait plate 588, the trap pin 586 is displaced, and the jaw 582 snaps over the bait plate 588 to pen the rodent between the jaw 582 and the base 580. In that position, the trap 516 is in a "Tripped" condition.

During the transition from the "Armed" condition to "Tripped" condition, the force of the snap causes the trap 516 to be lifted upwardly relative to the ground thereby releasing the leg 522 of the pest control device 514, thereby allowing the leg 522 to pivot as shown in FIGS. 17-18. As shown in FIG. 18, the outer casing 520 drops to the ground level when the trap 516 is lifted off of the leg 522. As described in greater detail below, the position sensor 84 monitors this orientation or position of the outer casing 520 and generates (x, y, z) orientation data that may be used to detect movement of the outer casing 520. The signals are then analyzed by the system 16 to determine the condition of the trap 516.

Figure 19:
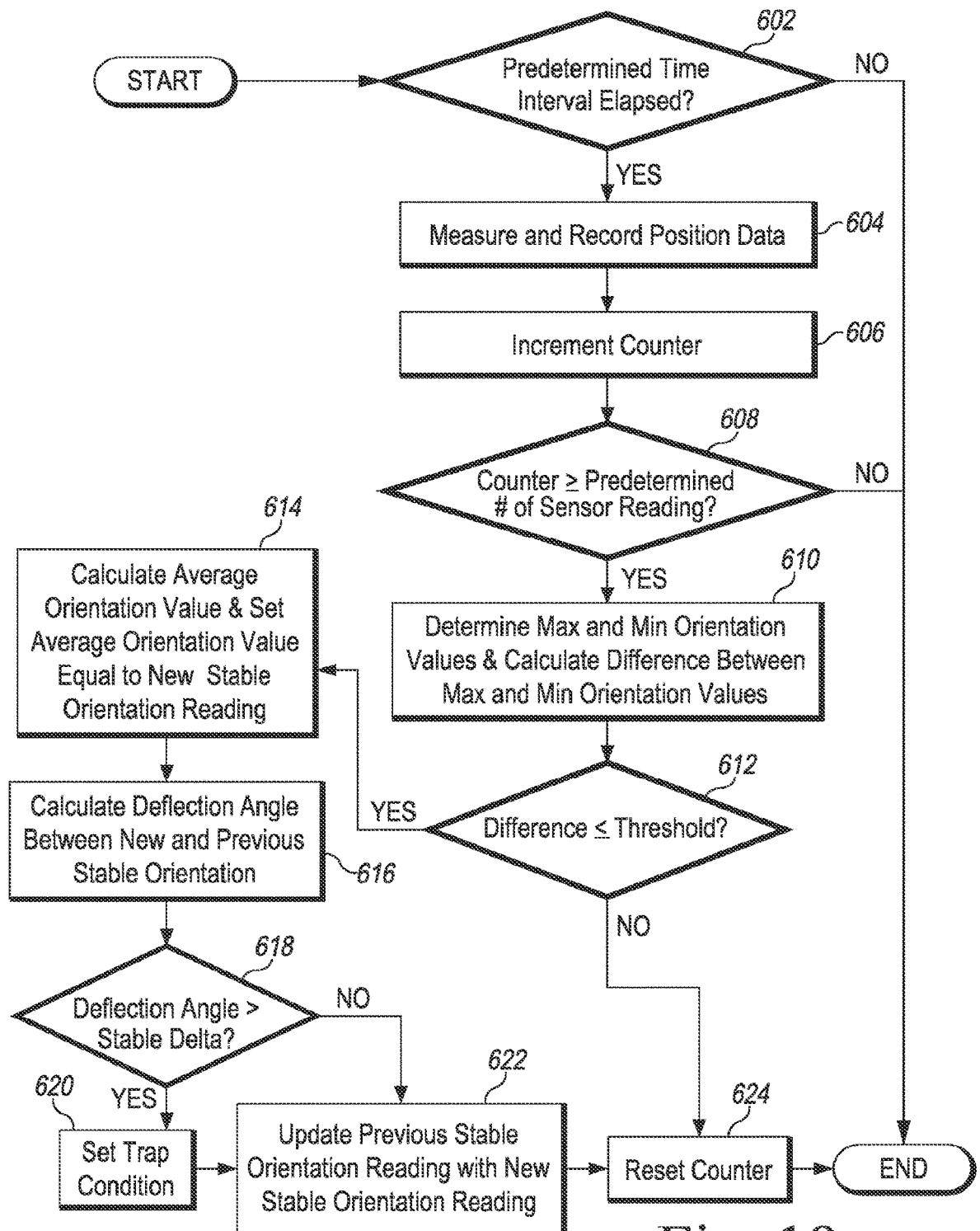
FIG. 19 is simplified block diagram of a control algorithm or routine for the system of FIG. 12.

Referring now to FIG. 19, a monitoring routine 600 for monitoring the orientation or position of a pest control device is illustrated. In the illustrative embodiment, the routine 600 is an exemplary subroutine used in block 104 of FIG. 6 for monitoring environmental sensor array. It should be appreciated that in other embodiments the routine may be a separate routine that may be used as an alternative to the routine 100 of FIG. 6. As described in greater detail below, the routine 600 causes the ECU 62 to monitor the data generated by the position sensor 84 and take a reading of the (x, y, z) coordinates of the position sensor 84 (and hence outer casing 520) at predetermined time intervals. When the ECU 62 has taken a predetermined number of readings, the ECU 62 may process the sensor data to determine whether the pest control device 514 is stable and determine whether the movement of the pest control device 514 exceeds a predetermined angular threshold. Alternatively, in some embodiments, the position sensor 84 may detect the real-time movement of the pest control device 514 throughout the transition from the "Armed" condition to "Tripped" condition to monitor the position of the outer casing 520. If sufficient movement data of the pest control device 514 is detected, such movement data may be transmitted to the remote system 16 to be used to analyze the status of the trap 516.

The routine 600 begins in block 602 in which the ECU 62 determines whether a predetermined time interval has elapsed since the ECU 62 stored its last reading of the sensor data. If the ECU 62 determines that the predetermined time interval has not yet been elapsed, the monitoring routine 600 ends. If the ECU 62 determines that the predetermined time interval has elapsed, the monitoring routine 600 proceeds to block 604. It should be appreciated that the predetermined time interval may be programmable and may be set based on the nature of the rodent and environment surrounding the pest control device 514. In the illustrative embodiment, the predetermined time interval is 60 seconds.

In block 604, the ECU 62 monitors and records the (x, y, z) coordinates included in the position data generated by the sensor 84. Each sensor reading indicates the orientation or position of the outer casing 520 of the pest control device 514. After the ECU 62 has taken a reading of the (x, y, z) coordinates, the monitoring routine 600 may advance to block 606. In block 606, the ECU 62 increments a counter and record that sensor reading before the routine 600 advances to block 608.

In block 608, the ECU 62 determines whether the counter has recorded a predetermined number of sensor readings. When the counter is equal to or greater than the predetermined number of sensor readings, the routine 600 may advance to block 610 to further process the sensor data. When the counter indicates that less than the predetermined number of sensor readings have been taken, the routine 600 ends. It should be appreciated that the predetermined number of sensor readings may be programmable and may be set based on the nature of the rodent and environment surrounding the pest control device 514. The illustrative embodiment, the predetermined number of sensor readings is equal to 8 sensor readings. In other words, the ECU 62 must take 8 sets of (x, y, z,) coordinates before proceeding to block 610; if it has taken less than 8 sets, the routine 600 ends.

When the routine 600 advances to block 610, the ECU 62 processes the data recorded during each reading of the predetermined number of sensor readings. In the illustrative embodiment, the ECU 62 processes the data recorded by the previous 8 sensor readings. In processing the data, the ECU 62 determines the maximum (x_max, y_max, z_max) and minimum (x_min, y_min, z_min) values for each of the x, y, and z coordinates from the previous 8 sensor readings (i.e., the predetermined number of sensor readings). The ECU 62 then uses the maximum and minimum values for each of the x, y, and z coordinates in block 612.

In block 612, the ECU 62 determines whether the outer casing 520 was in a stable orientation or stable position over the predetermined number of sensor readings. To do so, the ECU 62 calculates the differences between the maximum of each axis (x_max, y_max, z_max) and minimum of each axis (x_min, y_min, z_min) values for each of the x, y, and z coordinates. The maximum of each axis is compared individually against a programmable threshold for that axis. For example, the difference between x_max and x_min of the 8 sensor readings is compared against a programmable threshold (x_threshold), the difference between y_max and y_min of the 8 sensor readings is compared against a programmable threshold (y_threshold), and the difference between z_max and z_min of the 8 sensor readings is compared against a programmable threshold (z_threshold). If all of the differences between the maximum and minimum values of the x, y, and z coordinates are less than or equal to the corresponding programmable thresholds (x_threshold, y_threshold, z_threshold), the routine 600 advances to block 614. If any one of the differences is greater than the corresponding programmable thresholds, the routine 600 advances to block 624 in which the counter is reset before the routine 600 ends.

The programmable thresholds used in block 612 are set based on, among other things, the nature of the rodent and environment surrounding the pest control device 514. Ideally, with no physical movement of the outer casing 520, the differences between the maximum and minimum values of the x, y, and z coordinates should be at or near zero. However, disruptions from environmental factors, including wind and vibration, may cause the outer casing 520 to move. The programmable thresholds may be set higher than zero to permit movement of the casing 520 caused by wind and/or vibration. In the illustrative embodiment, each programmable threshold for the x, y, z coordinates (x_threshold, y_threshold, z_threshold) is set to 50 units, where each unit represents 1/1024th of the force of gravity.

In some embodiments, the ECU 62 may add the differences between the maximum (x_max, y_max, z_max) and minimum (x_min, y_min, z_min) values and compare the sum of the differences to a net programmable threshold (i.e., the sum of x_threshold, y_threshold, and z_threshold).

As described above, if the difference between the maximum and minimum values of the x, y, and z coordinates is less than or equal to the programmable threshold, the routine 600 may advance to block 614. In block 614, the ECU 62 calculates average values for the x, y, and z coordinates recorded during the predetermined number of sensor readings. In other words, the ECU 62 calculates average x, y, and z coordinate values taken during the previous 8 sensor readings. The ECU 62 then stores the average x, y, and z coordinate values as new stable orientation values $A_x$, $A_y$, and $A_z$, and the routine 600 may advance to block 616.

In block 616, the ECU 62 calculates the deflection angle between the new stable orientation values and the previous stable orientation values. To do so, the ECU 62 recalls from memory the previous stable orientation values $B_x$, $B_y$, and $B_z$. The ECU 62 may then calculate a deflection angle between the new and previous stable orientations using Equation (3) below.

$$DeflectionAngle = \cos^{-1}\left(\frac{(A_X * B_X) + (A_Y * B_Y) + (A_Z * B_Z)}{\sqrt{(A_X^2 + A_Y^2 + A_Z^2) * (B_X^2 + B_Y^2 + B_Z^2)}}\right) \quad (3)$$

$A_x$, $A_y$, $A_z$ are the coordinates of new stable orientation, and $B_x$, $B_y$, $B_z$ are the coordinates of previous stable orientation.

Subsequent to calculating the deflection angle between the new and previous stable orientations, the ECU 62 proceeds to block 618 in which the ECU 62 determines whether the calculated deflection angle is greater than a predetermined angular threshold. In the illustrative embodiment, the predetermined angular threshold is equal to 2.5 degrees. The predetermined angular threshold is a predetermined minimum deflection angle to prevent false positive readings by eliminating insignificant changes in orientation caused by the environment surrounding. The predetermined angular threshold is programmable and is determined based on, among other things, the environment surrounding the pest control device 514. It should be appreciated that in other embodiments the predetermined angular threshold may be different from 2.5 degrees.

If the ECU 62 determines that the deflection angle is less than or equal to the predetermined angular threshold, the ECU 62 concludes that the orientation change in the pest control device 514 is insignificant and proceeds to block 622. In block 622, the ECU 62 updates the previous stable orientation readings $B_x$, $B_y$, and $B_z$ with the new stable orientation readings $A_x$, $A_y$, and $A_z$ before advancing to block 624 in which the ECU 62 resets the counter and proceeds to end the monitoring routine 600.

If the ECU 62 determines that the deflection angle is greater than the predetermined angular threshold, the routine 600 advances to block 620. In block 620, the ECU 62 sends a message to the system 16 to inform the system 16 that the deflection angle exceeded the predetermined angular threshold. The system 16 may then use that information to determine the status of the trap 516 and inform the operator. For example, during an initial set up of the trap when some movements of the pest control device 514 are expected due to the human activities, the system 16 sets a default status of the trap 516 as "Trapped." When the trap 516 is properly positioned and is stable, the ECU 62 stores an initial orientation of the trap and sends the message to the system 16 that the deflection angle exceeded the predetermined angular threshold. The system 16 then updates the status of the trap 516 to "Armed." Subsequently, when the system 16 receives the following message that the deflection angle exceeded the predetermined angular threshold, the system 16 updates the status of the trap 516 to "Tripped" and alerts the operator that the trap 516 has been tripped. The routine 600 may then advance to block 622 and subsequently to block 624 as described above.

Referring now to FIGS. 20-31, other embodiments of a pest control device are shown. The embodiments of FIGS. 20-31 include many of the same features described above in regard to FIGS. 12-18. The same reference numbers are used in FIGS. 20-31 to identify features that are the same or similar to those described above in regard to the embodiments of FIGS. 1-19. As shown in FIGS. 20-31, the pest control devices 714, 814, 914 may be separately coupled to a snap-type rodent trap 516; however, the coupling mechanism may vary between different embodiments as will be described in detail below.

In the embodiments of FIGS. 20-31, the electrical components 54 of the devices 714, 814, 914 are the same or similar to the electrical components of the devices 14, 514 including the position sensor 84, the ECU 62, the transceiver 66, the capacitive sensing array 70, and so forth. In operation, the position sensor 84 of each pest control devices 714, 814, 914 is operable to detect movement of its respective pest control device 714, 814, 914 and provide an indication of whether the trap 516 has been activated, as described in greater detail below. Similar to the position sensor 84 described above in regard to the embodiments of FIGS. 1-19, the position sensor 84 is a 3-axis digital accelerometer such as, for example, the MMA8652, which is commercially available from Freescale.

Referring now to FIGS. 20-23, the pest control device 714 is coupled to the snap-type rodent trap 516 via integrated clips 722 of the pest control device 714. Accordingly, the pest control device 714 includes an outer casing 720 and the pair of clips 722 attached to the outer casing 720. The outer casing 720, like the casing 520 described above in regard to FIGS. 11-19, houses and protects the electrical components 54 from environmental factors, including water ingress, dust, dirt, leaves, humidity, and waste.

Figure 20:
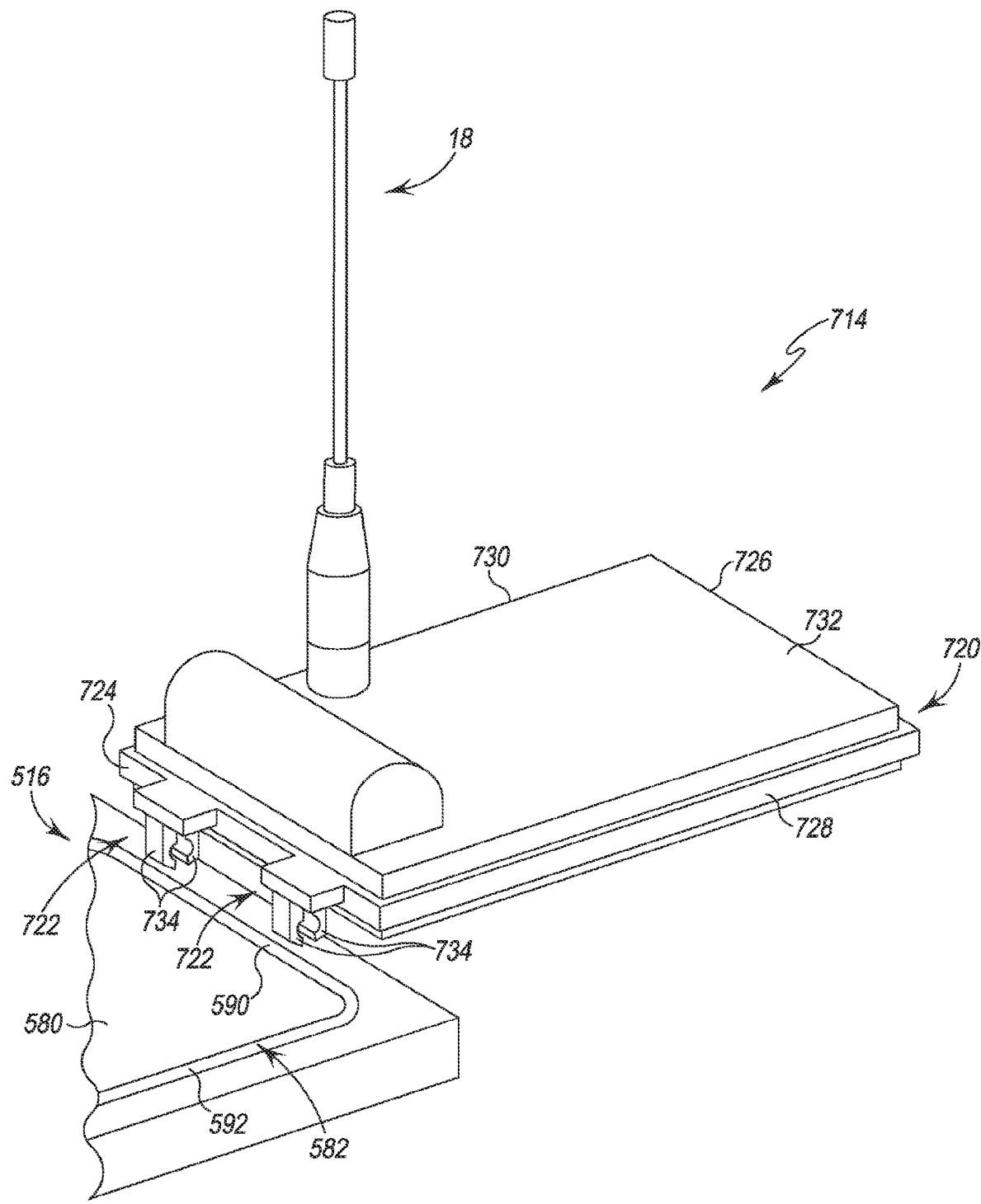
FIG. 20 is a perspective view of another embodiment of the pest control device configured to be coupled to the pest trap device via integrated clips.

As shown in FIG. 20, the outer casing 720 is generally rectangular-shaped and has two short top and bottom walls 724, 726, respectively, and two long side walls 728, 730. The antenna 18 is connected at its base to the top surface 732 of the outer casing 720 via the connector 536 to permit the device 714 to communicate with the system 16. The outer casing 720 further includes the pair of clips 722 that extends outwardly from the top wall 724 of the outer casing 720. Each clip 722 includes teeth 734 that engage a center wire 590 of the generally U-shaped jaw 582 of the trap 516 to secure the outer casing 720 to the trap 516. To set up the trap 516 relative to the control device 714, the clips 722 of the outer casing 720 engage the center wire 590 of the jaw 582 of the trap 516 such that the outer casing 720 is hinged to the jaw 582 of the trap 516 and may pivot relative to the trap 516.

Figure 21:
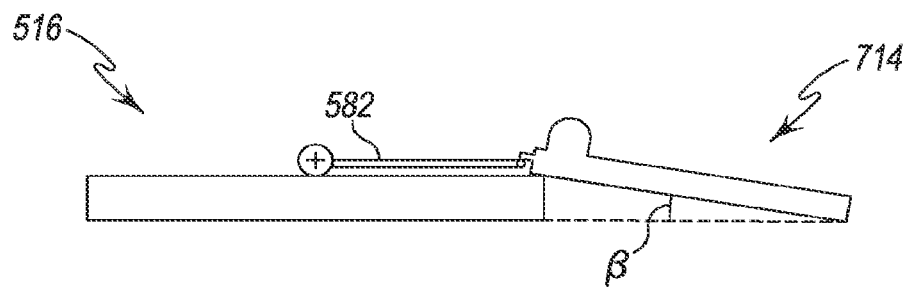
FIGS. 21-23 are side elevation views of the system of FIG. 20 in operation.
Figure 22:
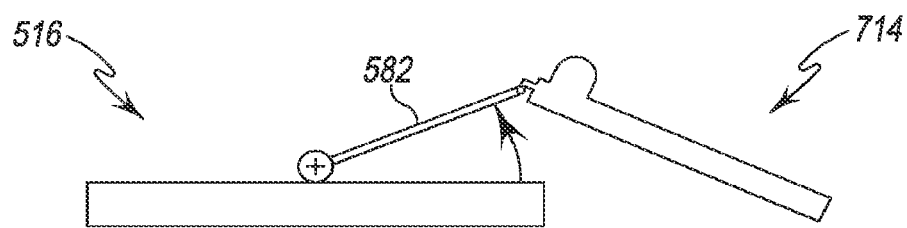
Figure 23:
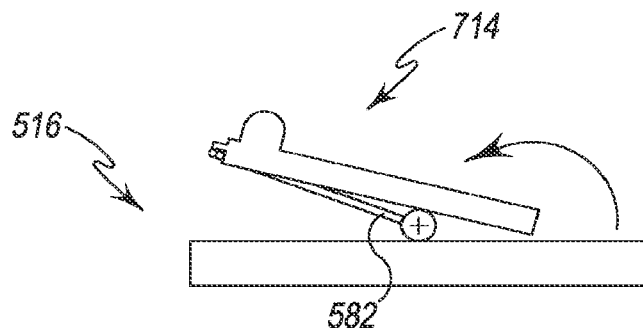

As shown in FIGS. 21-23, the snap-type rodent trap 516 can be either in the "Armed" condition (FIG. 21) or the "Tripped" condition (FIG. 23). In the "Armed" condition, the jaw 582 is held in place by the trap pin 586 and the outer casing 720 is laterally attached to the trap 516 such that the top wall 724 of the outer casing 720 that is attached to the trap 516 is forced upward, and the outer casing 720 is positioned at a angle β relative to the ground. During the transition from the "Armed" condition to "Tripped" condition, the jaw 582 snaps over the bait plate 588 to pen the rodent between the jaw 582 and the base 580 of the trap 516. As the jaw 582 snaps over the bait plate 588, the control device 714 is lifted upwardly with the jaw 582 relative to the ground while allowing the clips 722 of the outer casing 720 to pivot as shown in FIGS. 21-23. The jaw 582 and the outer casing 720 then drop relative to the ground causing the trap 516 to be in "Tripped" condition. The position sensor 84 monitors this orientation of the outer casing 720 and generates (x, y, z) position data that may be used to detect movement of the outer casing 720.

A routine, similar to the routine 600 described above in regard to FIGS. 12-19, causes the ECU 62 to monitor the data generated by the position sensor 84 and take a reading of the (x, y, z) coordinates of the position sensor 84 (and hence outer casing 720) at predetermined time intervals. When the ECU 62 has taken a predetermined number of readings, the ECU 62 may process the sensor data to determine whether the pest control device 714 is stable and determine whether the movement of the pest control device 714 exceeds a predetermined angular threshold. The signals are then analyzed by the system 16 to determine the condition of the trap 516. Alternatively, in some embodiments, the position sensor 84 may detect the real-time movement of the pest control device 714 throughout the transition from the "Armed" condition to "Tripped" condition to monitor the position of the outer casing 720.

Referring now to FIGS. 24-27, the pest control device 814 is coupled to the snap-type rodent trap 516 via integrated arms 822 of the pest control device 814. Accordingly, the outer casing 820 of the control device 814 includes a pair of generally L-shaped arms 822 attached to the outer casing 820. The outer casing 820, like the casing 520, 720 described above in regard to FIGS. 11-23, houses and protects the electrical components 54 from environmental factors, including water ingress, dust, dirt, leaves, humidity, and waste.

Figure 24:
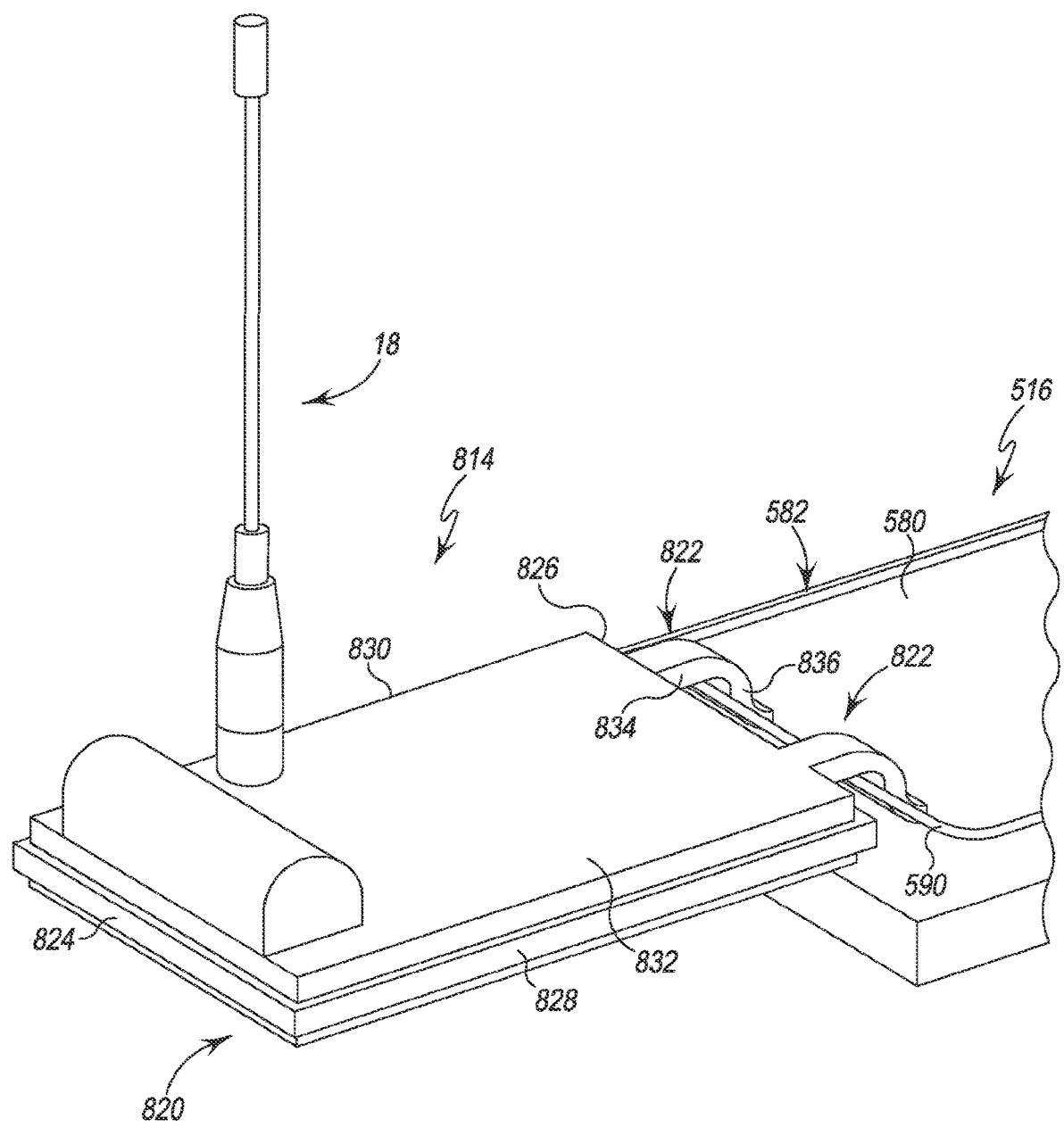
FIG. 24 is a perspective view of another embodiment of the pest control device coupled to the pest trap device via integrated arms.

As shown in FIG. 24, the outer casing 820 is generally rectangular-shaped and has two short top and bottom walls 824, 826, respectively, and two long side walls 828, 830. The antenna 18 is connected at its base to the top surface 832 of the outer casing 820 via the connector 536 to permit the device 814 to communicate with the system 16. The outer casing 820 further includes the pair of arms 822 that extends outwardly from the bottom wall 826 of the outer casing 820. Each arm 822 includes a first member 834 extends outwardly from the bottom wall 826 of the outer casing 820 and is connected to a second member 836. The second member 836 is bent downwardly toward the ground, forming a generally L-shape relative to the first member 834.

To set up the control device 814 relative to the trap 516, the arms 822 of the outer casing 820 are placed over the center wire 590 of the jaw 582 of the trap 516 such that the second members 826 of the arms 822 engage the base 580 of the trap 516. Thus, in the "Armed" condition shown in FIGS. 24-25, the control device 814 is placed relative to the trap 516 such that the center wire 590 of the jaw 582 is placed within a groove between the second members 836 of the arms 822 and the bottom wall 826 of the outer casing 820 and between the first members 834 of the arms 822 and the base 580 of the trap 516. In this configuration, the outer casing 820 is positioned at a angle β relative to the ground, and the arms 822 of the control device 814 do not make direct physical contact with the jaw 582 of the trap 516.

Figure 25:
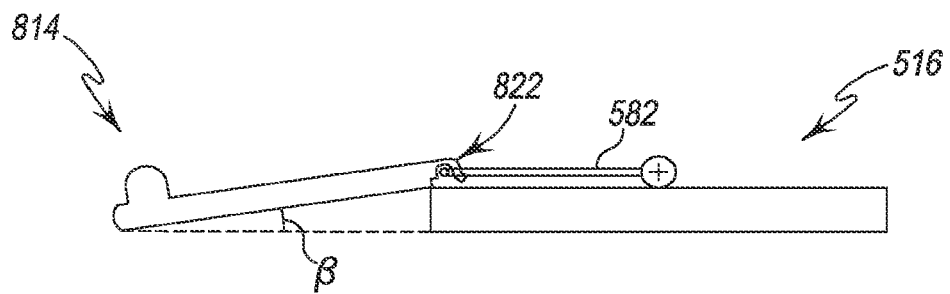
FIGS. 25-27 are side elevation views of the system of FIG. 24 in operation.
Figure 26:
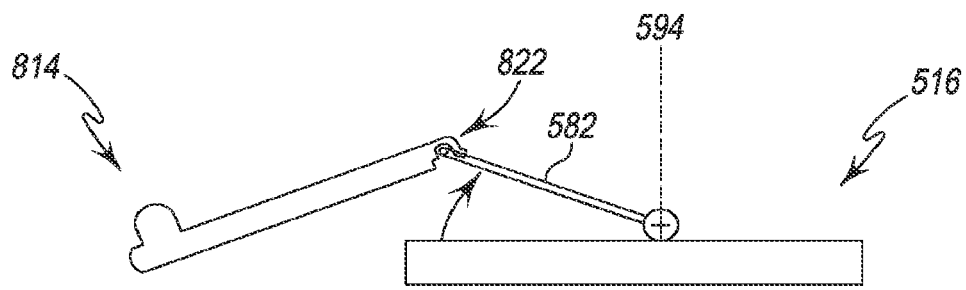
Figure 27:
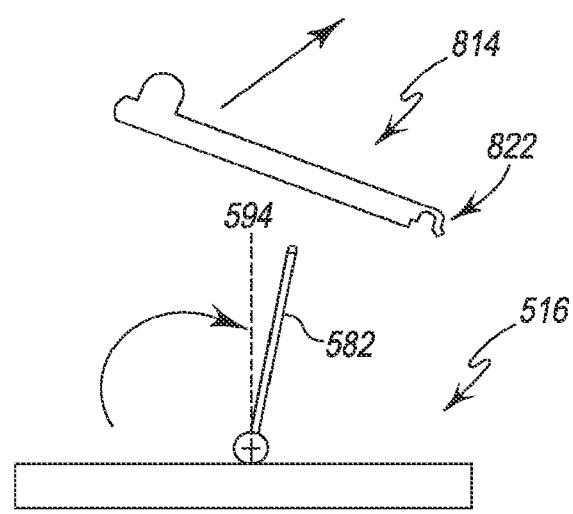

During the transition from the "Armed" condition to "Tripped" condition as shown in FIGS. 25-27, the jaw 582 snaps over the bait plate 588 to pen the rodent between the jaw 582 and the base 580 of the trap 516. As the jaw 582 started to snap, the center wire 590 of the jaw 582 engages the L-shaped arms 822 of the outer casing 820 causing the control device 814 to be lifted upwardly relative to the ground, as shown in FIG. 26. When the center wire 590 of the jaw 582 passes an imaginary line 594 orthogonal to the base 580 of the trap 516, the center wire 590 of the jaw 582 drags the second member 826 of L-shaped arms 822 and the force of the snap throws the control device 814 away from the center wire 590, as shown in FIG. 26. The position sensor 84 monitors this orientation of the outer casing 820 and generates (x, y, z) position data that may be used to detect movement of the outer casing 820.

A routine, similar to the routine 600 described above in regard to FIGS. 12-19, causes the ECU 62 to monitor the data generated by the position sensor 84 and take a reading of the (x, y, z) coordinates of the position sensor 84 (and hence outer casing 820) at predetermined time intervals. When the ECU 62 has taken a predetermined number of readings, the ECU 62 may process the sensor data to determine whether the pest control device 814 is stable and determine whether the movement of the pest control device 814 exceeds a predetermined angular threshold. The signals are then analyzed by the system 16 to determine the condition of the trap 516. Alternatively, in some embodiments, the position sensor 84 may detect the real-time movement of the pest control device 814 throughout the transition from the "Armed" condition to "Tripped" condition to monitor the position of the outer casing 820.

Referring now to FIGS. 28-31, the pest control device 914 is coupled to the snap-type rodent trap 516 via an integrated channel 922 of the pest control device 914. The outer casing 920, like the casing 520, 720, 820 described above in regard to FIGS. 11-27, houses and protects the electrical components 54 from environmental factors, including water ingress, dust, dirt, leaves, humidity, and waste.

Figure 28:
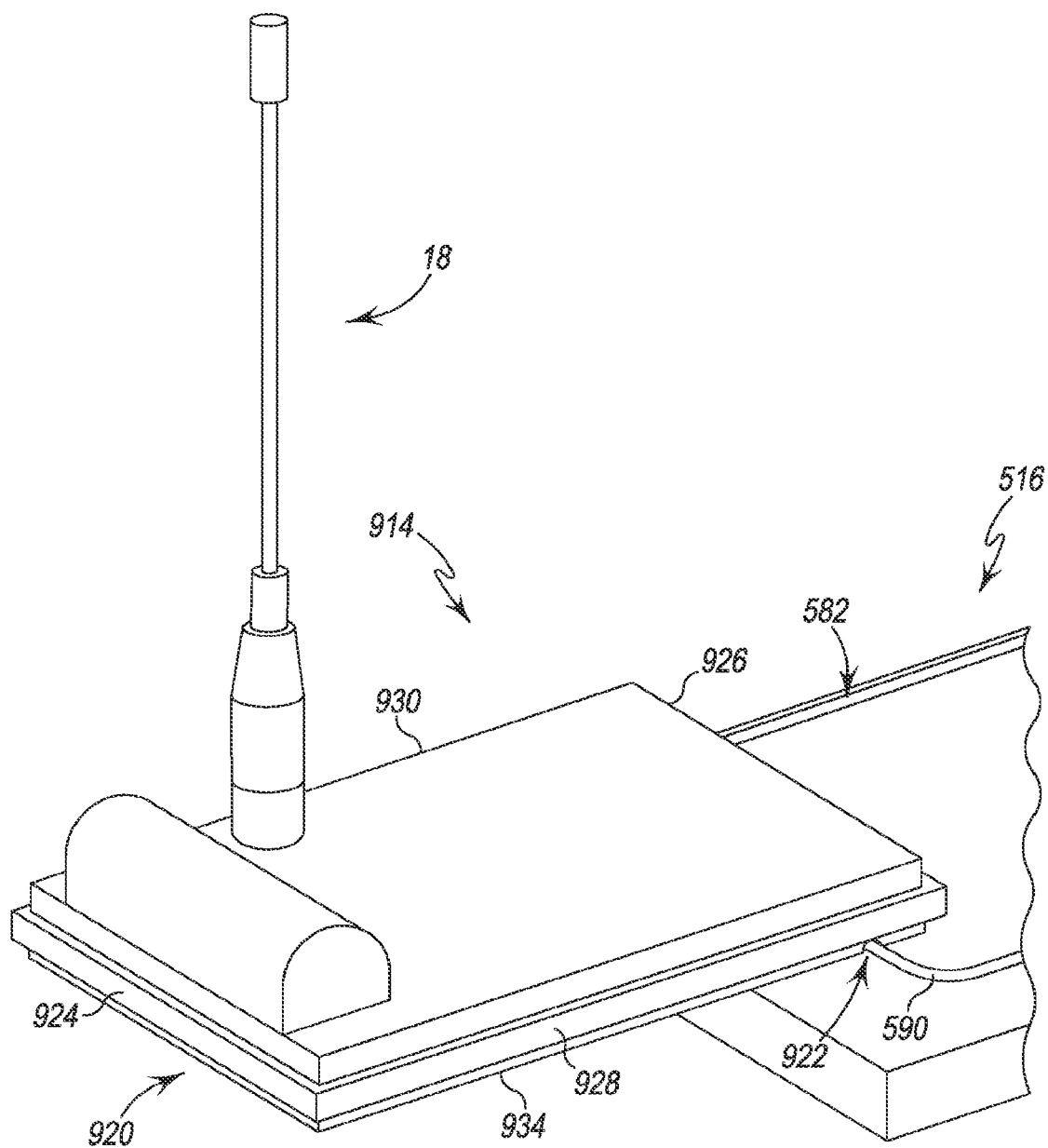
FIG. 28 is a perspective view of another embodiment of the pest control device coupled to the pest trap device via an integrated channel.

As shown in FIG. 28, the outer casing 920 is generally rectangular-shaped and has two short top and bottom walls 924, 926, respectively, and two long side walls 928, 930. The antenna 18 is connected at its base to the top surface 932 of the outer casing 920 via the connector 536 to permit the device 914 to communicate with the system 16. The outer casing 920 of the control device 914 further includes a channel 922. The channel 922 is defined in the bottom surface 934 of the outer casing 920 and extends from one sidewall 928 to the opposite sidewall 530 near the bottom wall 926 of the outer casing 920. The channel 922 is configured to receive the center wire 590 of the jaw 582 of the trap 516, as shown in FIG. 28. When the control device 914 is set relative to the trap 516, the center wire 590 is received in the channel 922 causing the outer casing 520 to be positioned at an angle β relative to the ground.

Figure 29:
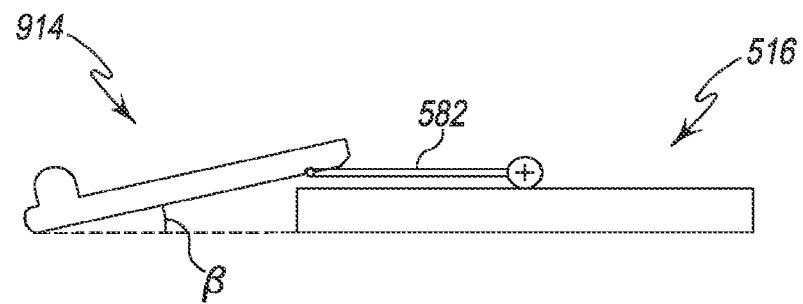
FIGS. 29-31 are side elevation views of the system of FIG. 28 in operation.
Figure 30:
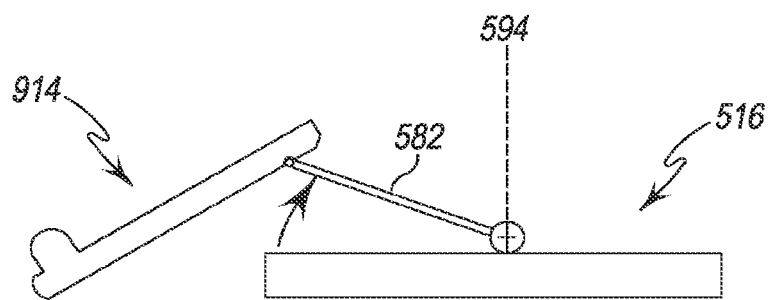
Figure 31:
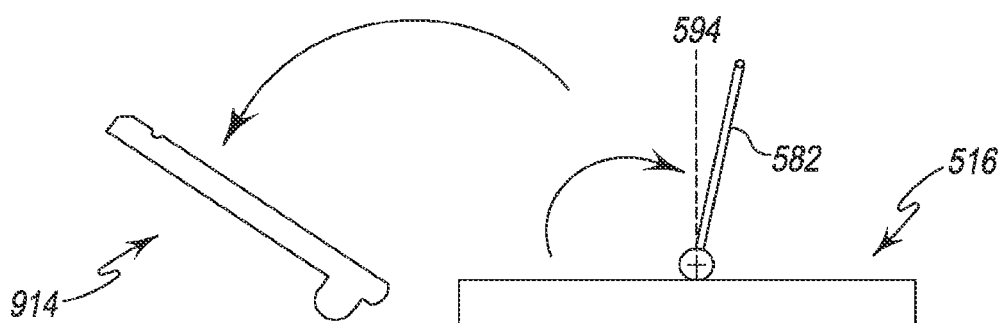

In the "Armed" condition shown in FIGS. 28-29, the control device 914 is placed relative to the trap 516 such that the center wire 590 of the jaw 582 of the trap 516 engages the channel 922 of the outer casing 920. During the transition from the "Armed" condition to "Tripped" condition as shown in FIGS. 29-31, the jaw 582 snaps over the bait plate 588. As the jaw 582 started to snap, the center wire 590 of the jaw 582 remains in the channel 922 of the outer casing 920 lifting the control device 914 upwardly relative to the ground, as shown in FIG. 30. When the center wire 590 of the jaw 582 passes an imaginary line 594 orthogonal to the base 580 of the trap 516, force of the snap further lifts the control device 914 and pushes it outwardly away from trap 516, thereby flipping the control device 914, as shown in FIG. 31. The position sensor 84 monitors this orientation of the outer casing 920 and generates (x, y, z) position data that may be used to detect movement of the outer casing 920.

A routine, similar to the routine 600 described above in regard to FIGS. 12-19, causes the ECU 62 to monitor the data generated by the position sensor 84 and take a reading of the (x, y, z) coordinates of the position sensor 84 (and hence outer casing 920) at predetermined time intervals. When the ECU 62 has taken a predetermined number of readings, the ECU 62 may process the sensor data to determine whether the pest control device 914 is stable and determine whether the movement of the pest control device 914 exceeds a predetermined angular threshold. The signals are then analyzed by the system 16 to determine the condition of the trap 516. Alternatively, in some embodiments, the position sensor 84 may detect the real-time movement of the pest control device 814 throughout the transition from the "Armed" condition to "Tripped" condition to monitor the position of the outer casing 920.

Figure 32:
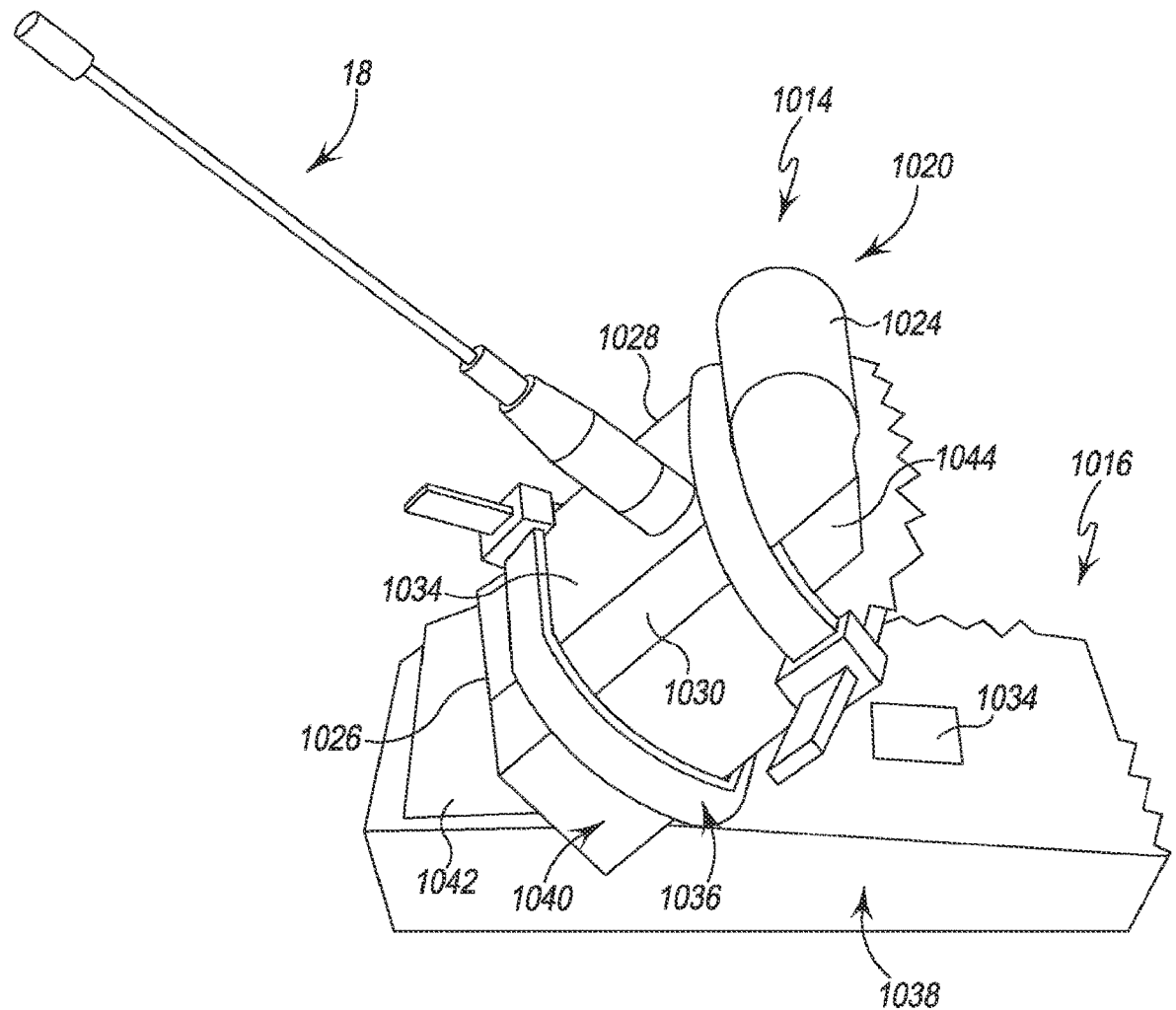
FIG. 32 is a perspective view of another embodiment of the pest control device of FIG. 3 mounted on a tomcat snap trap device.

Referring now to FIG. 32, the pest control device 1014, same or similar to FIG. 1-19, is mounted on a tomcat snap trap 1016. As shown in FIG. 32, the outer casing 1020 is generally rectangular-shaped and has two short top and bottom walls 1024, 1026, respectively, and two long side walls 1028, 1030. The antenna 18 is connected at its base to the top surface 1032 of the outer casing 1020 via the connector 536 to permit the device 1014 to communicate with the system 16.

The tomcat snap trap 1016 includes a base 1038 and a pivoting member 1040 pivotally coupled to a biasing member 1042. The pivoting member 1040 includes a flat top surface 1044. The outer casing 1020 of the pest control device 1014 is mounted on the top surface 1044 of the snap trap 1016 by a fastener 1036. In the "Armed" condition, the pivoting member 1040 is held in place by the biasing member 1042. In this configuration, if a rodent applies sufficient downward pressure on a bait plate 1034, the biasing member 1042 is displaced, and the pivoting member 1040 falls on the bait plate 1034 to pen the rodent between the pivoting member 1040 and the base 1038. During the transition from the "Armed" condition to "Tripped" condition, the control device 1014 moves with the pivoting member 1040. In the illustrative embodiment, the movement of the pivoting member 1040 represents the movement of the control device 1014. The position sensor 84 monitors this orientation of the outer casing 1020 and generates (x, y, z) position data that may be used to detect movement of the outer casing 1020.

A routine, similar to the routine 600 described above in regard to FIGS. 12-19, causes the ECU 62 to monitor the data generated by the position sensor 84 and take a reading of the (x, y, z) coordinates of the position sensor 84 (and hence outer casing 820) at predetermined time intervals. When the ECU 62 has taken a predetermined number of readings, the ECU 62 may process the sensor data to determine whether the pest control device 1014 is stable and determine whether the movement of the pest control device 1014 exceeds a predetermined angular threshold. The signals are then analyzed by the system 16 to determine the condition of the trap 516. Alternatively, in some embodiments, the position sensor 84 may detect the real-time movement of the pest control device 814 throughout the transition from the "Armed" condition to "Tripped" condition to monitor the position of the outer casing 1020.

Figure 33:
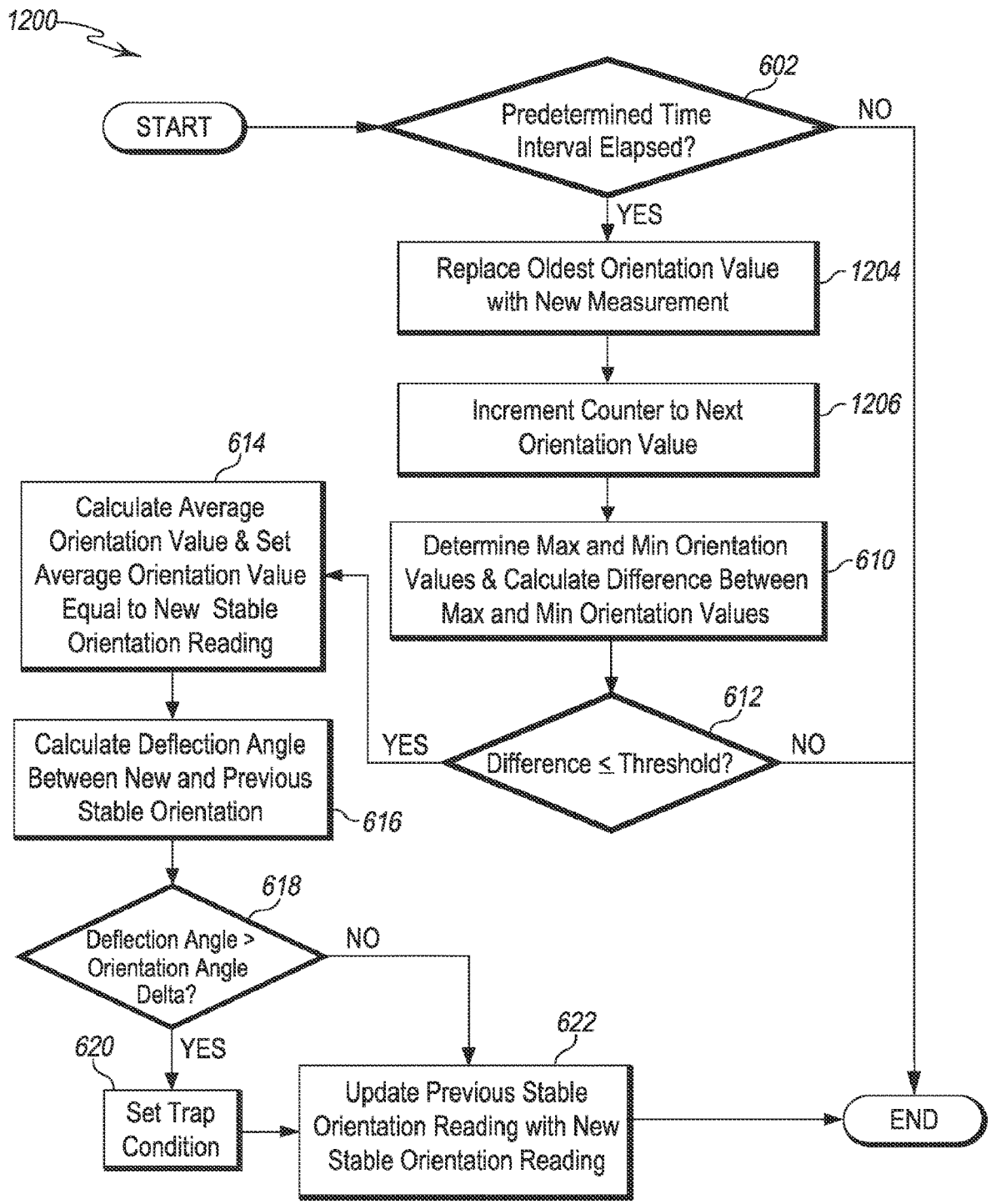
FIG. 33 is simplified block diagram of a control algorithm or routine for the system of FIG. 12.

Referring now to FIG. 33, a monitoring routine 1200 for monitoring the orientation or position of any of the pest control devices described herein is illustrated. In the illustrative embodiment, the routine 1200 is an exemplary subroutine used in block 104 of FIG. 6 for monitoring environmental sensor array. It should be appreciated that in other embodiments the routine may be a separate routine that may be used as an alternative to the routine 100 of FIG. 6 or the routine 600 of FIG. 19. Some of the blocks of the routine 1200 are similar to the blocks of the routine 600, and the same reference numbers will be used to identify such blocks in FIG. 33. Similar to the routine 600, the routine 1200 causes the ECU 62 to monitor the data generated by the position or orientation sensor 84 and take a reading of the (x, y, z) coordinates of the position sensor 84 (and hence outer casing) at predetermined time intervals. When the ECU 62 has taken a predetermined number of readings, the ECU 62 may process the sensor data to determine whether the pest control device is stable and determine whether the movement of the pest control device exceeds a predetermined threshold.

The routine 1200 begins in block 602 in which the ECU 62 determines whether a predetermined time interval has elapsed since the ECU 62 stored its last reading of the sensor data. If the ECU 62 determines that the predetermined time interval has not yet been elapsed, the monitoring routine 1200 ends. If the ECU 62 determines that the predetermined time interval has elapsed, the monitoring routine 1200 proceeds to block 1204. It should be appreciated that the predetermined time interval may be programmable and may be set based on the nature of the rodent and environment surrounding the pest control device 514. The illustrative embodiment, the predetermined time interval is 60 seconds.

In block 1204, the ECU 62 monitors and records the (x, y, z) coordinates included in the position data generated by the sensor 84. In the illustrative embodiment, the (x, y, z) coordinates form an orientation value that indicates the orientation or position of the outer casing of the pest control device. In the routine 1200, the ECU 62 identifies the oldest stored orientation value (i.e., the oldest reading of (x, y, z) coordinates stored in memory) and replaces the oldest orientation value with the new (x, y, z) coordinates of the current reading. Illustratively, the ECU 62 stores only 8 sets of (x, y, z) coordinates, and the new (x, y, z) coordinates of the current reading replace one of those sets. It should be appreciated that in other embodiments the ECU may be configured to store additional or fewer sets of (x, y, z) coordinates (i.e., additional orientations values).

In the illustrative embodiment, a counter is used to index the stored (x, y, z) coordinates so that the ECU 62 may identify which set is the oldest set. At the conclusion block 1204, the routine 1200 may advance to block 1206 in which the counter is incremented to correspond to the next stored set of (x, y, z) coordinates, which is now the oldest set of (x, y, z) coordinates in memory. It should be appreciated that other software tools may be used to identify the oldest set of (x, y, z) coordinates. The routine 1200 may advance to block 610.

When the routine 600 advances to block 610, the ECU 62 processes the 8 sets of (x, y, z) coordinates to determine the maximum (x_max, y_max, z_max) and minimum (x_min, y_min, z_min) values for each of the x, y, and z coordinates of the 8 sets of (x, y, z) coordinates stored in memory. The ECU 62 may then use the maximum and minimum values for each of the x, y, and z coordinates in block 612.

In block 612, the ECU 62 determines whether the pest control device was in a stable orientation or stable position over the predetermined number of sensor readings. To do so, the ECU 62 calculates the differences between the maximum of each axis (x_max, y_max, z_max) and minimum of each axis (x_min, y_min, z_min) values for each of the x, y, and z coordinates. The maximum of each axis is compared individually against a programmable threshold for that axis. If all of the differences between the maximum and minimum values of the x, y, and z coordinates are less than or equal to the corresponding programmable thresholds (x_threshold, y_threshold, z_threshold), the routine 1200 may advance to block 614. If any one of the differences is greater than the corresponding programmable thresholds, the routine 1200 ends.

In block 614, the ECU 62 calculates average values for the x, y, and z coordinates recorded during the predetermined number of sensor readings. In other words, the ECU 62 calculates average x, y, and z coordinate values taken during the previous 8 sensor readings. The ECU 62 then stores the average x, y, and z coordinate values as new stable orientation values $A_x$, $A_y$, and $A_z$, and the routine 600 may advance to block 616. In block 616, the ECU 62 calculates the deflection angle between the new stable orientation values and the previous stable orientation values, as described above in regard to FIG. 19.

Subsequent to calculating the deflection angle between the new and previous stable orientations, the ECU 62 proceeds to block 618 in which the ECU 62 determines whether the calculated deflection angle is greater than a predetermined angular threshold. In the illustrative embodiment, the predetermined angular threshold is equal to 2.5 degrees, which is a predetermined minimum deflection angle to prevent false positive readings by eliminating insignificant changes in orientation caused by the environment surrounding. It should be appreciated that in other embodiments the predetermined angular threshold may be different from 2.5 degrees.

If the ECU 62 determines that the deflection angle is less than or equal to the predetermined angular threshold, the ECU 62 concludes that the orientation change in the pest control device 514 is insignificant and may proceed to block 622. In block 622, the ECU 62 updates the previous stable orientation readings $B_x$, $B_y$, and $B_z$ with the new stable orientation readings $A_x$, $A_y$, and $A_z$ before the monitoring routine 600 ends.

If the ECU 62 determines that the deflection angle is greater than the predetermined angular threshold, the routine 1200 advances to block 620. In block 620, the ECU 62 sends a message to the system 16 to inform the system 16 that the deflection angle exceeded the predetermined angular threshold. The system 16 may then use that information to determine the status of the trap 516 and inform the operator, as described above in regard to FIG. 19. The routine 600 may then advance to block 622 in which the ECU 62 updates the previous stable orientation readings $B_x$, $B_y$, and $B_z$ with the new stable orientation readings $A_x$, $A_y$, and $A_z$ before the monitoring routine 600 ends.

In some embodiments, the routines may include one or more subroutines to accommodate human activity and eliminate false pest detection events, which may occur due to a service provider or installer needing to handle the pest control device or trap. In one embodiment, the installer or other operator may activate a subroutine in which all sensed activity is ignored for a programmable time interval to permit the installer to position the pest control device and/or trap in a desired location and orientation. Similarly, the routines may include a subroutine in which all sensed activity is ignored for a programmable time interval to permit a service provider to re-install the pest control device and/or trap in the desired location and orientation following a service event. It should be appreciated that the programmable time intervals may be the same or may be separately programmed.

The routines may also include another sub-routine in which sensor data is buffered for a programmable time interval prior to a service event. This may be accomplished using a number of data buckets. Each bucket may be filled for ¼ of the pre-service time interval. The oldest bucket may be counted, emptied, and filled with new sensor data if no service event occurs during the pre-service time interval. If a service event occurs during the pre-service time interval, all sensor data included in the buckets may be discarded. It should be appreciated that the pest control system may utilize any combination of the sub-routines described above.

In some embodiments, the position or orientation sensor may be a separate movable component of the pest control device. In such embodiments, the orientation sensor may be directly coupled to the pest trap device. For example, the pest trap device may be a cage including a housing, a trap door pivotally attached to the housing, and a biasing member connecting the door and the housing. In some embodiments, bait may be deposited into the cage to lure the rodents into the cage. The position or orientation sensor of the pest control device may be coupled to the trap door to monitor movement of the trap door. The pest control device may be inside or outside of the housing of the pest trap device. In the "Armed" condition, the trap door of the pest trap device may be open, creating an entrance path into the cage. When a pest/rodent enters the cage, the pest/rodent may trigger the biasing member to close the trap door, thereby entrapping the rodent and setting the cage in the "Tripped" condition. During this transition from the "Armed" condition to "Tripped" condition, the orientation sensor moves with the trap door. The orientation sensor monitors the orientation of the trap door to generate (x, y, z) position data.

A routine, similar to the routine 600 described above in regard to FIGS. 12-19, may cause the ECU 62 to monitor the data generated by the orientation sensor and take a reading of the (x, y, z) coordinates generated by the orientation sensor at predetermined time intervals. When the ECU 62 has taken a predetermined number of readings, the ECU 62 may process the sensor data to determine whether the trap door is stable and determine whether the movement of the trap door exceeds a predetermined angular threshold. The signals are then analyzed by the system 16 to determine the condition of the cage. Alternatively, in some embodiments, the orientation sensor may detect the real-time movement of the trap door throughout the transition from the "Armed" condition to "Tripped" condition to monitor the position of the cage.

The pest control device 14 may be used in conjunction with other pest control devices 14 to monitor a site. To do so, the pest control devices 14 may be positioned at various locations throughout a building or other facility. Optional repeaters incorporating two-way transceivers may be used to extend the range of communications between the devices 14. Additionally, a gateway device incorporating a two-way transceiver for communicating with the devices 14 and/or repeaters and the remote system 16. The gateway device may incorporate digital cellular technology to permit it to communicate with the remote system 16. An exemplary system of repeaters and gateway devices is shown and described in U.S. Pat. No. 8,026,822, which issued Sep. 8, 2009 and is expressly incorporated herein by reference.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There is a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A pest control device, comprising:
   an orientation sensor; and
   an electronic controller coupled to the orientation sensor, wherein the electronic controller is configured to:
      record a plurality of orientation values from the orientation sensor, each orientation value comprising (x, y, z) coordinates corresponding to an orientation of the pest control device;
      determine whether the pest control device is stable based on the plurality of orientation values;
      determine an orientation of the pest control device when the pest control device is stable; and
      determine a trap condition of a pest trap device that is removably coupled to the pest control device based on the orientation of the pest control device.

2. The pest control device of claim 1, wherein the electronic controller is further configured to transmit the trap condition to a remote system in response to a determination of the trap condition.

3. The pest control device of claim 2, wherein to determine the trap condition comprises to compare the orientation of the pest control device to a previous stable orientation of the pest control device.

4. The pest control device of claim 3, wherein:
to compare the orientation of the pest control device to the previous stable orientation of the pest control device comprises to determine whether the orientation of the pest control device differs from the previous stable orientation by a predetermined angular threshold; and
to transmit the trap condition comprises to transmit the trap condition in response to a determination that the orientation of the pest control device differs from the previous stable orientation by the predetermined angular threshold.

5. The pest control device of claim 1, wherein to record the plurality of orientation values further comprises to record each orientation value from the orientation sensor after a predetermined time interval has elapsed until a predetermined number of the orientation values are recorded.

6. The pest control device of claim 5, wherein the predetermined number of the orientation values is at least 8 orientation values.

7. The pest control device of claim 5, wherein to record the plurality of orientation values comprises to (i) increment a counter in response to recording of each orientation value from the orientation sensor and (ii) clear the counter after the predetermined number of the orientation values are recorded.

8. The pest control device of claim 1, wherein to record the plurality of orientation values further comprises to replace an oldest orientation value of a predetermined number of the orientation values with an orientation value from the orientation sensor after a predetermined time interval has lapsed.

9. The pest control device of claim 1, wherein to determine whether the pest control device is stable based on the plurality of orientation values comprises to:
determine maximum orientation values and minimum orientation values from the plurality of orientation values for each of the (x, y, z) coordinates;
determine differences between the maximum orientation values and the minimum orientation values for each of the (x, y, z) coordinates of the plurality of orientation values;
determine whether all of the differences are less than or equal to a first set of predetermined thresholds;
determine an average orientation value for each of the (x, y, z) coordinates of the plurality of orientation values when all of the differences are less than or equal to the first set of predetermined thresholds; and
store the (x, y, z) coordinates of the average orientation value as a new stable orientation value to indicate that the pest control device is stable.

10. The pest control device of claim 9, wherein to determine an orientation of the pest control device when the pest control device is stable comprises to:
identify a (x, y, z) coordinates of a previous stable orientation value;
determine a deflection angle of the pest control device using the (x, y, z) coordinates of the new stable orientation value;
determine the deflection angle exceeds a second predetermined threshold;
update the trap condition when the second predetermined threshold is exceeded; and
update the previous stable orientation value with the new stable orientation value.

11. The pest control device of claim 10, wherein to determine the deflection angle of the pest control device includes to use the following equation:

$$DeflectionAngle = \cos^{-1}\left(\frac{(A_X * B_X) + (A_Y * B_Y) + (A_Z * B_Z)}{\sqrt{(A_X^2 + A_Y^2 + A_Z^2) * (B_X^2 + B_Y^2 + B_Z^2)}}\right)$$

wherein "$A_x$", "$A_y$", "$A_z$" are the (x, y, z) coordinates of the new stable orientation value, and "$B_x$", "$B_y$", "$B_z$" are the (x, y, z) coordinates of the previous stable orientation value.

12. The pest control device of claim 1, wherein to determine whether the pest control device is stable based on the plurality of orientation values comprises to:
determine maximum orientation values and minimum orientation values from the plurality of orientation values for each of the (x, y, z) coordinates;
determine differences between the maximum orientation values and the minimum orientation values for each of the (x, y, z) coordinates;
determine whether a sum of the differences is less than or equal to a first predetermined threshold;
determine average orientation values for each of the (x, y, z) coordinates from the plurality of orientation values when the sum of the differences is less than or equal to the first predetermined threshold; and
update the average orientation values to a new stable orientation coordinates.

13. One or more non-transitory, machine readable media comprising a plurality of instructions that when executed cause a pest control device to:
record a plurality of orientation values from an orientation sensor of the pest control device, each orientation value comprising (x, y, z) coordinates corresponding to an orientation of the pest control device;
determine whether the pest control device is stable based on the plurality of orientation values;
determine an orientation of the pest control device when the pest control device is stable; and
determine a trap condition of a pest trap device that is removably coupled to the pest control device based on the orientation of the pest control device.

14. The one or more non-transitory, machine readable media of claim 13, further comprising a plurality of instructions that when executed cause the pest control device to transmit the trap condition to a remote system in response to a determination of the trap condition.

15. The one or more non-transitory, machine readable media of claim 14, wherein to determine the trap condition comprises to compare the orientation of the pest control device to a previous stable orientation of the pest control device.

16. The one or more non-transitory, machine readable media of claim 15, wherein:
to compare the orientation of the pest control device to the previous stable orientation of the pest control device comprises to determine whether the orientation of the pest control device differs from the previous stable orientation by a predetermined angular threshold; and
to transmit the trap condition comprises to transmit the trap condition in response to a determination that the orientation of the pest control device differs from the previous stable orientation by the predetermined angular threshold.

17. The one or more non-transitory, machine readable media of claim 13, wherein to determine whether the pest control device is stable based on the plurality of orientation values comprises to:
- determine maximum orientation values and minimum orientation values from the plurality of orientation values for each of the (x, y, z) coordinates;
- determine differences between the maximum orientation values and the minimum orientation values for each of the (x, y, z) coordinates of the plurality of orientation values;
- determine whether all of the differences are less than or equal to a first set of predetermined thresholds;
- determine an average orientation value for each of the (x, y, z) coordinates of the plurality of orientation values when all of the differences are less than or equal to the first set of predetermined thresholds; and
- store the (x, y, z) coordinates of the average orientation value as a new stable orientation value to indicate that the pest control device is stable.

18. The one or more non-transitory, machine readable media of claim 17, wherein to determine an orientation of the pest control device when the pest control device is stable comprises to:
- identify a (x, y, z) coordinates of a previous stable orientation value;
- determine a deflection angle of the pest control device using the (x, y, z) coordinates of the new stable orientation value;
- determine the deflection angle exceeds a second predetermined threshold;
- update the trap condition when the second predetermined threshold is exceeded; and
- update the previous stable orientation value with the new stable orientation value.

19. The one or more non-transitory, machine readable media of claim 18, wherein to determine the deflection angle of the pest control device includes to use the following equation:

$$DeflectionAngle = \cos^{-1}\left(\frac{(A_X * B_X) + (A_Y * B_Y) + (A_Z * B_Z)}{\sqrt{(A_X^2 + A_Y^2 + A_Z^2) * (B_X^2 + B_Y^2 + B_Z^2)}}\right)$$

wherein "$A_x$", "$A_y$", "$A_z$" are the (x, y, z) coordinates of the new stable orientation value, and "$B_x$", "$B_y$", "$B_z$" are the (x, y, z) coordinates of the previous stable orientation value.

20. The one or more non-transitory, machine readable media of claim 13, wherein to determine whether the pest control device is stable based on the plurality of orientation values comprises to:
- determine maximum orientation values and minimum orientation values from the plurality of orientation values for each of the (x, y, z) coordinates;
- determine differences between the maximum orientation values and the minimum orientation values for each of the (x, y, z) coordinates;
- determine whether a sum of the differences is less than or equal to a first predetermined threshold;
- determine average orientation values for each of the (x, y, z) coordinates from the plurality of orientation values when the sum of the differences is less than or equal to the first predetermined threshold; and
- update the average orientation values to a new stable orientation coordinates.

\* \* \* \* \*